(12) United States Patent
Lin

(10) Patent No.: US 9,959,228 B2
(45) Date of Patent: May 1, 2018

(54) METHOD FOR AUTOMATICALLY MATCHING ELECTRONIC DEVICES

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 334 days.

(21) Appl. No.: 14/735,704

(22) Filed: Jun. 10, 2015

(65) Prior Publication Data

US 2016/0188509 A1 Jun. 30, 2016

(30) Foreign Application Priority Data

Dec. 31, 2014 (CN) .......................... 2014 1 0856128

(51) Int. Cl.
  *G06F 13/40* (2006.01)
  *G06F 13/362* (2006.01)
(52) U.S. Cl.
  CPC ........ *G06F 13/362* (2013.01); *G06F 13/4068* (2013.01); *H04W 4/80* (2018.02)
(58) Field of Classification Search
  CPC ... G06F 13/362; G06F 13/4068; H04W 4/008
  See application file for complete search history.

(56) References Cited

U.S. PATENT DOCUMENTS

| 8,823,494 | B1 | 9/2014 | Kovitz et al. | |
| 2008/0057992 | A1* | 3/2008 | Griffin | H04W 4/08 455/518 |
| 2009/0174530 | A1 | 7/2009 | Yen et al. | |
| 2010/0195539 | A1* | 8/2010 | Tian | H04L 47/824 370/255 |
| 2011/0294359 | A1 | 12/2011 | Cho et al. | |
| 2012/0296986 | A1* | 11/2012 | Hassan | H04W 12/06 709/206 |
| 2013/0031275 | A1 | 1/2013 | Hanes | |
| 2014/0064258 | A1* | 3/2014 | Montag | H04W 84/12 370/338 |
| 2014/0112200 | A1* | 4/2014 | Lor | H04W 76/02 370/255 |
| 2014/0273854 | A1* | 9/2014 | Breckman | H04W 76/021 455/41.2 |

* cited by examiner

*Primary Examiner* — Nimesh G Patel
(74) *Attorney, Agent, or Firm* — ScienBiziP, P.C.

(57) ABSTRACT

A method for group matching electronic devices includes entering a system for group matching, activating an automatic group matching mode of a master electronic device and generating a master automatic matching identification code, activating a group matching mode of a slave electronic device and generating a function software automatic matching code and a slave automatic matching identification code, sending out the master automatic matching identification code to the slave electronic device, writing the interface code of the master automatic matching identification code into the wireless module of the slave electronic device, setting up a function software of the master electronic device having the function software automatic matching code as the function software for controlling an operation of the slave electronic device, and completing the automatic matching between the wireless modules of the master and slave electronic devices.

10 Claims, 24 Drawing Sheets

METHOD FOR AUTOMATICALLY MATCHING ELECTRONIC DEVICES

CROSS-REFERENCE TO RELATED APPLICATIONS

This application claims priority to Chinese Patent Application No. 201410856128.8 filed on Dec. 31, 2014, the contents of which are incorporated by reference herein.

FIELD

The subject matter herein generally relates to a method for matching electronic devices, and more particularly to a method for automatically matching master electronic devices and slave electronic devices in a group manner.

BACKGROUND

A television or a monitor can connect with one or more electronic devices, such as mobile phones, tablet computers or set-top boxes, whereby audio/video (A/V) signals can flow from these electronic devices to the television or monitor. To achieve the connections, a plurality of cables is required which causes inconvenience.

The television or monitor has limited connection ports which generally include one to four ports such as high definition multimedia interface (HDMI)/video graphics array (VGA)/display port (DP)/Other ports, resulting in that the capability of expansion of the television or monitor is limited.

A master electronic device such as an all-in-one (AIO) computer can connect with one or more slave electronic devices such as mobile phones, tablet computers, television (TV) set-top boxes to achieve data exchange therebetween thereby to expand the function of the AIO computer. Furthermore, the AIO computer can connect with peripheral electronic devices such as universal serial bus (USB) hard disk drive, Bluetooth (BT) keyboard, mouse to facilitate the operation of the AIO computer. However, the connections between the AIO computer and these slave electronic devices are set up and completed in a one-by-one manner by an near field communication (NFC) if the slave electronic devices have wireless communication capability or by electrical cable connectors if they have not. The connections for the master electronic device with the slave electronic devices cannot be attained in a group manner, which is inconvenient.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
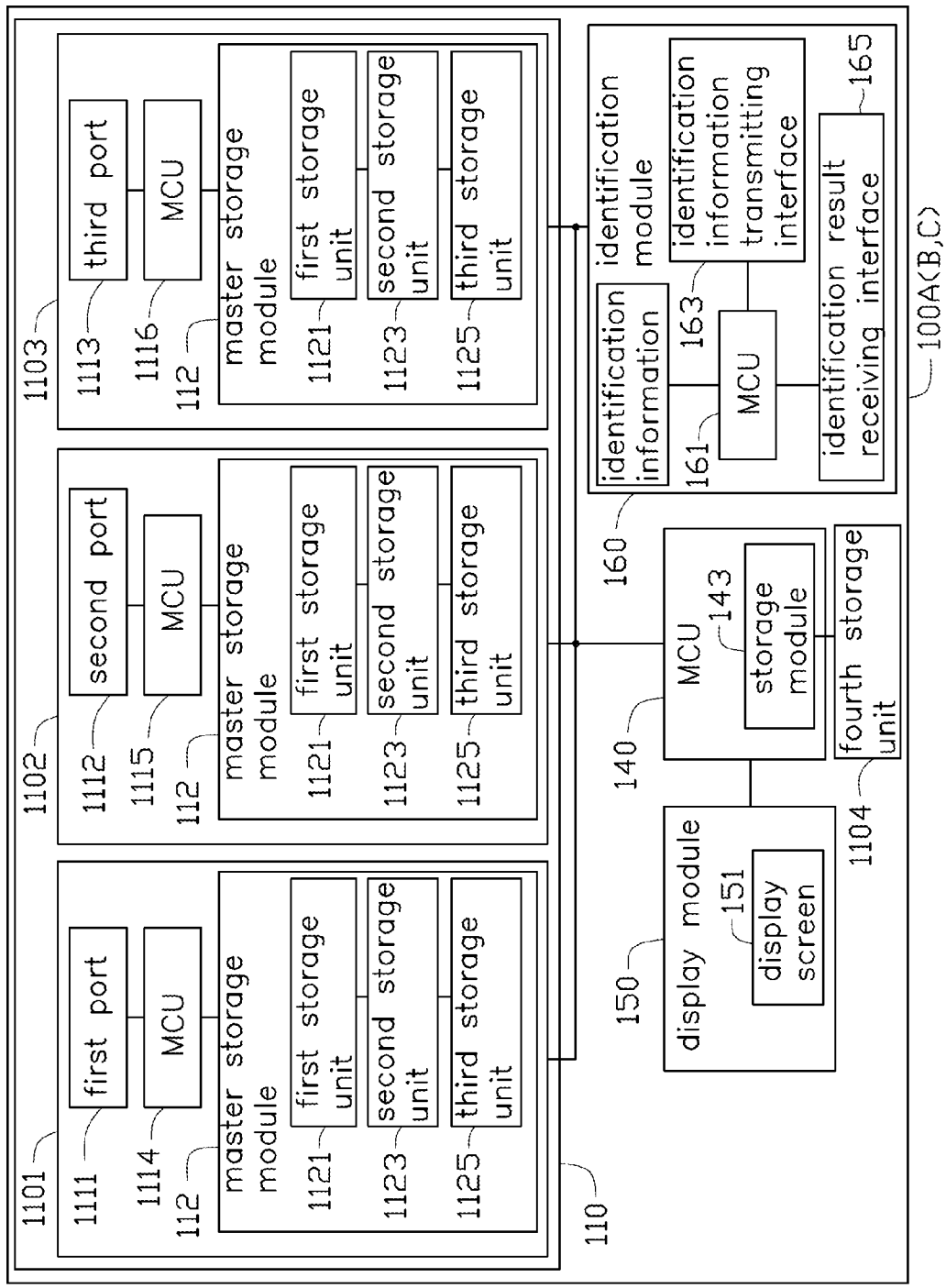
FIG. 1 is a block diagram of a master electronic device of a group matching system in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

The present disclosure is described in relation to a method for automatically group matching electronic devices and particularly for matching master electronic devices and slave electronic devices.

FIG. 1 illustrates a block diagram of each of a plurality of master electronic devices 100A, B, C. The master electronic device 100A (B, C) can be a mobile phone, particularly a smart phone, a monitor, a television, a tablet computer, a notebook computer, a desktop computer, an AIO computer or other electronic device. The master electronic device 100A (B, C) includes a transceiver module 110, which can receive and send out data in a wireless manner. The transceiver module 110 includes a plurality of wireless modules 1101, 1102, 1103 each including an antenna or an IR (infrared) transceiver. The wireless module 1101 includes a first port 1111, a micro control unit (MCU) 1114 and a master storage module 112. The wireless module 1102 includes a second port 1112, an MCU 1115 and a master storage module 112. The wireless module 1103 includes a third port 1113, an MCU 1116 and a master storage module 112. Each master storage module 112 includes a first storage unit 1121, a second storage unit 1123 and a third storage unit 1125. The master electronic device 100A (B, C) further includes a fourth storage unit 1104, an MCU 140 which is coupled with each of the wireless modules 1101-1103 via an Inter-Integrated Circuit (I²C) control bus. The I²C control bus can also be a universal asynchronous receiver/transmitter (UART) bus or other control bus. Control signals in the MCU 140 of the master electronic device 100A (B, C) can be sent out via the control bus and the MCUs 1114, 1115, 1116 to a slave electronic device.

The first storage unit 1121 of the wireless module 1101 of the master electronic device 100A (B, C) is used for storing therein an interface code, which is 100A1101, taking the master electronic device 100A as example, of the wireless module 1101 and an interface matching code of a wireless module of each of matched slave electronic devices. The first storage unit 1121 of the wireless module 1102 of the master electronic device 100A is used for storing therein an interface code, i.e., 100A1102 of the wireless module 1102 and an interface matching code of a wireless module of each of the matched slave electronic devices. The first storage unit 1121 of the wireless module 1103 of the master electronic device 100A is used for storing therein an interface code, i.e., 100A1103 of the wireless module 1103 and an interface matching code of a wireless module of each of the matched slave electronic devices.

The second storage units 1123 of the wireless modules 1101-1103 of the master electronic device 100A are used for storing therein group address codes of the matched slave electronic devices. The group address code of each slave electronic device and the interface matching code corresponding to each group address code are designated in a group specification. The group specification is stored in a storage module 143 of the MCU 140, MCUs 1114, 1115, 1116, and a transceiver module of each matched slave electronic device.

The master electronic device 100A further includes a fourth storage unit 1104 coupling with the MCU 140. The fourth storage unit 1104 is used for storing therein software interface matching codes 100A1104, 100B1104, 100B1104 of the master electronic device 100A and function control software (FW 1-$n$) and on-screen display (OSD) control interface of each matched slave electronic device. The function control software, which can control, for example, volume and display colors, of each slave electronic device can be stored in the fourth storage unit 1104 in advance to form a collected storage zone of function control software of different slave electronic devices in the fourth storage unit 1104. Group address code can match and integrate wireless modules and function control software in a group matching manner. Accordingly, the present disclosure can match a plurality of pairs of wireless modules and function control software.

The third storage unit 1125 of each master wireless module 1101-1103 is used for storing therein an automatic map code, which is commonly used by an extensive range of electronic devices. The automatic map code can be a binary code for example 0000 . . . 0000-1111 . . . 1111. The automatic map code also can be a hexadecimal code. In the present embodiment, the automatic map code is 10000000 and is used only when the function of automatic matching is activated. In other situations, the automatic map code will not be used.

The master electronic device 100A further includes a display module 150 coupling with the MCU 140. The display module 150 includes a display screen 151, which is used for displaying the OSD interface of different levels during the matching between the master electronic device 100A and slave electronic devices.

The master electronic device 100A further includes an identification module 160 which is used for storing therein identification information for identifying the slave electronic devices. The identification module 160 includes an MCU 161 which is an identification comparer, an identification information transmitting interface 163 and an identification result receiving interface 165. The MCU 161 is coupled with the MCUs 1114-1116. The identification information transmitting interface 163 is used for transmitting out identification information in series such as serial matching identification code. In the present embodiment, the identification module 160 can be an radio frequency (RF) module or an near end wireless module such as a near field communication (NFC) module or an IR module.

Figure 2:
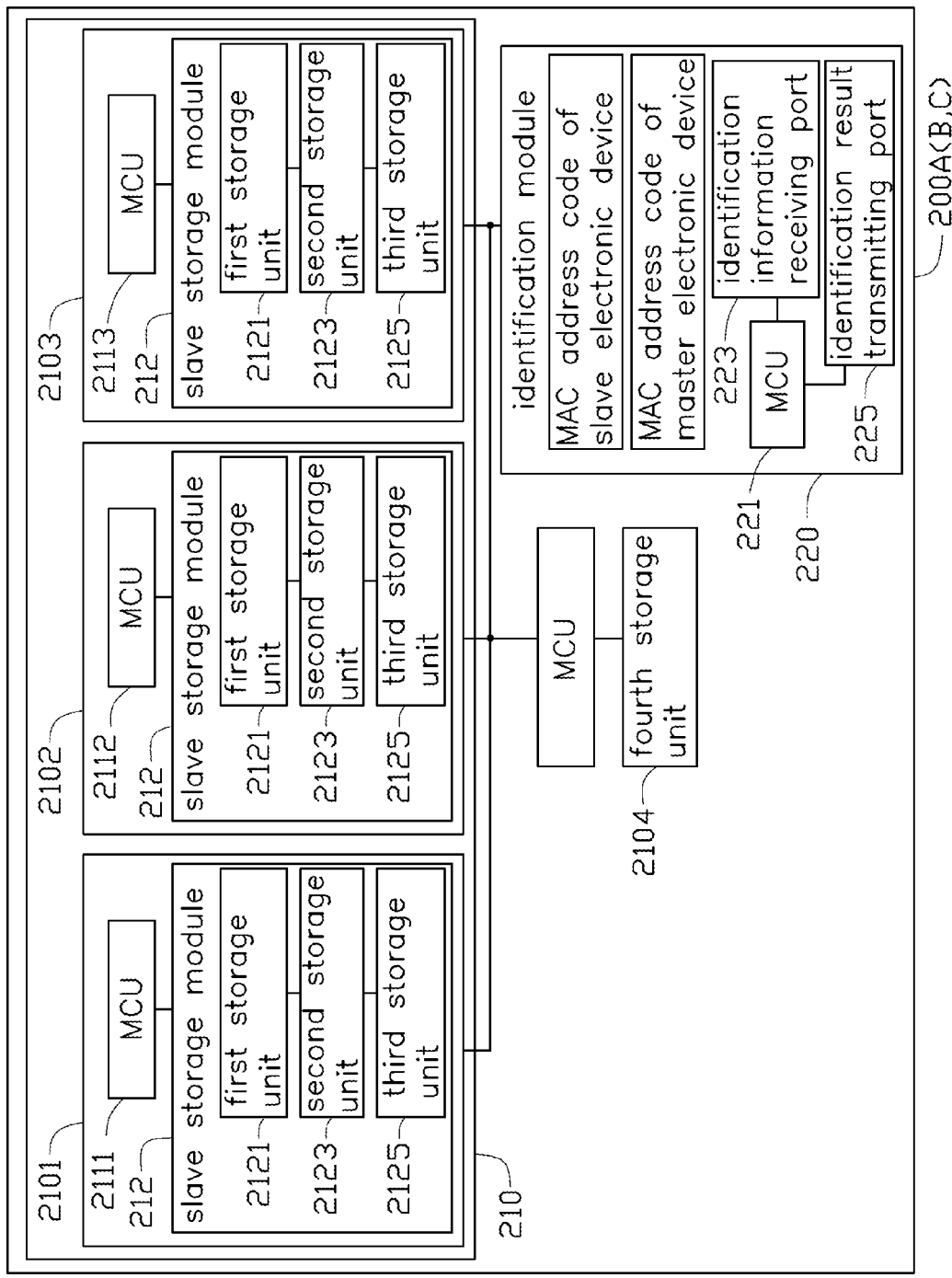
FIG. 2 is a block diagram of a slave electronic device of the group matching system in accordance with the present disclosure.
Figure 3:
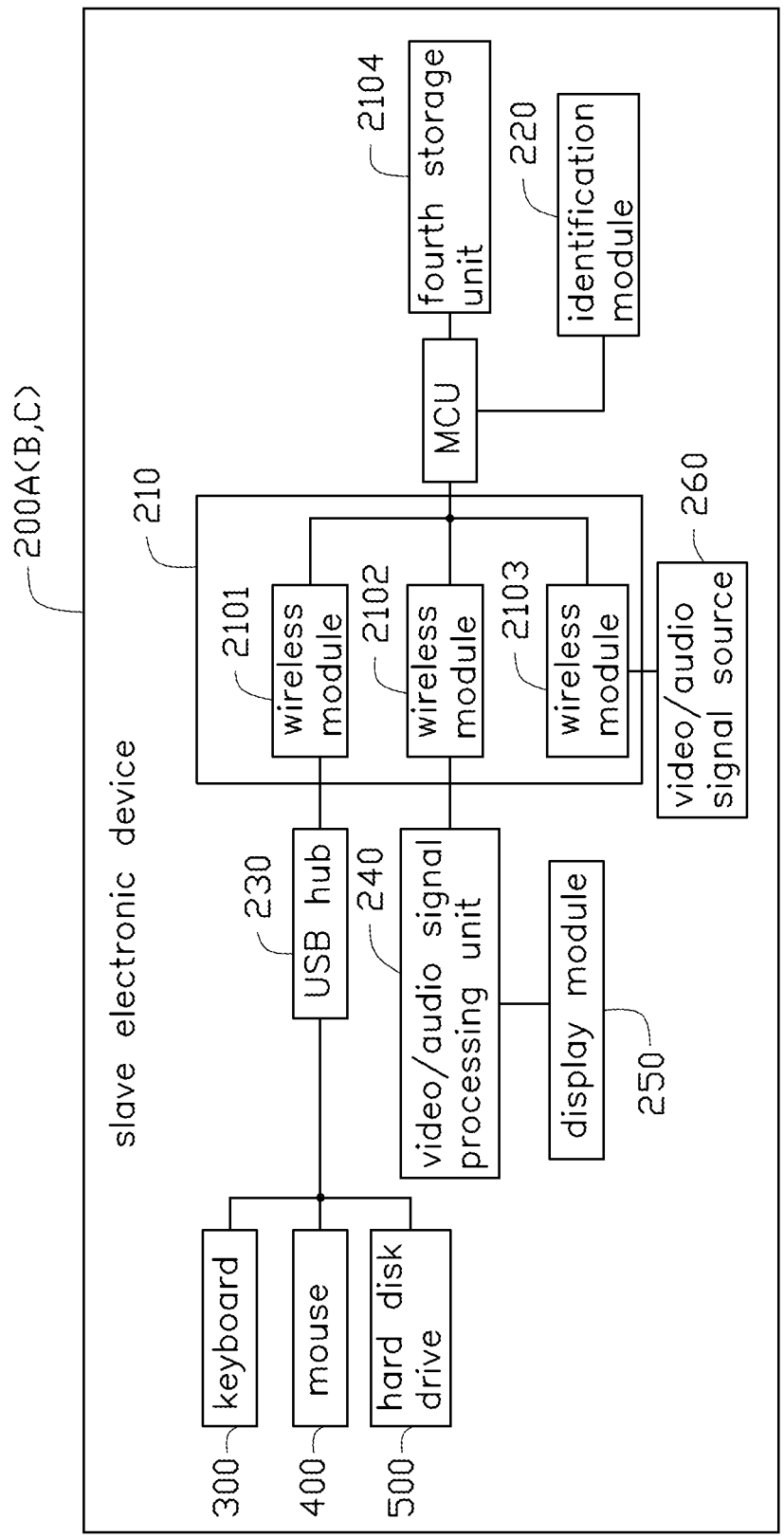
FIG. 3 is another block diagram of the slave electronic device of the group matching system in accordance with the present disclosure.

Referring to FIGS. 2-3, block diagrams of each of a plurality of slave electronic devices 200A, B, C are shown, wherein each slave electronic device 200A (B, C) can be a monitor, a television, a mobile phone (particularly a smart phone), a tablet computer, a desktop computer, an AIO computer or other electronic device. The master electronic devices 100A, B, C can couple with the slave electronic devices 200A, B, C via wireless communication such as Bluetooth, Wi-Fi, wireless gigabit alliance (WiGig), Miracast, IR, NFC, etc. The master electronic devices 100A, B, C and the slave electronic devices 200A, B, C can depend on the actual design to decide the adoption of which communication protocol to wirelessly couple with each other.

Taking the slave electronic device 200A and the master electronic device 100A as example, the slave electronic device 200A can include a transceiver module 210 for achieving wireless coupling with the transceiver module 110 of the master electronic device 100A. The transceiver module 210 includes a plurality of wireless modules 2101-2103 each including an antenna or an IR transceiver. A type of each of the wireless modules 2101-201c of the slave electronic device 200A is similar to a type of a corresponding one of the wireless modules 1101-1103 of the master electronic device 100A. For example, they are both Wi-Fi interfaces, Bluetooth interfaces, WiGig interfaces, Miracast interfaces, IR interfaces, or NFC interfaces. Furthermore, a signal format (protocol) communicated between each of the wireless modules 2101-201c of the slave electronic device 200A is similar to a signal format of the corresponding one of the wireless modules 1101-1103 of the master electronic device 100A, such as high definition multimedia (HDMI), universal serial bus (USB), mobile high definition link (MHL), external serial advanced technology attachment (E-Sata) or C BUS. Thus, the wireless modules 2101, 1101, the wireless modules 2102, 1102, and the wireless modules 2103, 1103 can wirelessly communicate with each other. The types of the wireless modules 2101-2103 are different from each other.

The wireless module 2101 includes an MCU 2111 and a slave storage module 212. The wireless module 2102 includes an MCU 2112 and a slave storage module 212. The wireless module 2103 includes an MCU 2113 and a slave storage module 212. Each slave storage module 212 includes a first, a second and a third storage unit 2121, 2123, 2125. The slave electronic device 200A further includes a fourth storage unit 2104.

Control signals from the master electronic device 100A are sent to the wireless modules 2101-2103 of the slave electronic device 200A, which are then sent to the MCUs 2111-2113, which control the operations of the slave electronic device 200A. The fourth storage unit 2104 of the slave electronic device 200A can store therein system operation software and function control code of each of the MCUs 2111-2113.

The first storage unit 1121 of the wireless module 1101 of the master electronic device 100A (B, C) is used for storing therein the interface matching code of the wireless module 2101 of the matched slave electronic device 200A (B, C). Accordingly, the interface matching codes stored in the first storage unit 1121 of the wireless module 1101 are 100A1101-200A2101 and 100A1101-200B2101 when the master and slave electronic devices 100A, 200A, 200B are matched with each other.

The first storage unit 1121 of the wireless module 1102 of the master electronic device 100A (B, C) is used for storing therein the interface matching code of the wireless module 2102 of the matched slave electronic device 200A (B, C). Accordingly, the interface matching codes stored in the first storage unit 1121 of the wireless module 1102 are 100A1102-200A2102 and 100A1102-200B2102 when the master and slave electronic devices 100A, 200A, 200B are matched with each other.

The first storage unit 1121 of the wireless module 1103 of the master electronic device 100A (B, C) is used for storing therein the interface matching code of the wireless module 2103 of the matched slave electronic device 200A (B, C). Accordingly, the interface matching codes stored in the first storage unit 1121 of the wireless module 1103 are 100A1103-200A2103 and 100A1103-200B2103 when the master and slave electronic devices 100A, 200A, 200B are matched with each other.

The first storage unit 2121 of the wireless module 2101 of the slave electronic device 200A (B, C) is used for storing therein interface code of the wireless module 2101 and interface matching code of the wireless module 1101 of the matched master electronic device 100A (B, C), wherein the interface code is 200A2101 and the interface matching codes are 200A2101-100A1101 and 200A2101-100B1101 when the slave and master electronic devices are slave electronic device 200A and master electronic devices 100A, 100B which are matched with each other.

The first slave storage unit 2121 of the wireless module 2102 of the slave electronic device 200A (B, C) is used for storing therein interface code of the wireless module 2102 and interface matching code of the wireless module 1102 of the matched master electronic device 100A (B, C), wherein the interface code is 200A2102 and the interface matching codes are 200A2102-100A1102 and 200A2102-100B1102 when the slave and master electronic devices are slave electronic device 200A and master electronic devices 100A, 100B which are matched with each other.

The first slave storage unit 2121 of the wireless module 2103 of the slave electronic device 200A (B, C) is used for storing therein interface code of the wireless module 2103 and interface matching code of the wireless module 1103 of the matched master electronic device 100A (B, C), wherein the interface code is 200A2103 and the interface matching codes are 200A2103-100A1103 and 200A2103-100B1103 when the slave and master electronic devices are slave electronic device 200A and master electronic device 100A, 100B which are matched with each other.

The second storage unit 1123 of each of the wireless modules 1101-1103 of the master electronic device 100A (B, C) is used for storing therein group address code of matched slave electronic device 200A (B, C). For example, the group address codes of the slave electronic devices 200A-200C are 01/DV1, 02/DV2 and 03/DV3, respectively, and all of the group address codes of the slave electronic devices 200A-200C which can couple with the master electronic device 100A (B, C) are stored in the second storage units 1123. The MCUs 1114-1116 can distribute and assign the group address codes to the slave electronic devices 200A-200C according to the number of the slave electronic devices 200A-200C. The group address code 01/DV1 corresponds to a group interface matching code, i.e., 200A2101-200A2102-200A2103-200A2104. The group address code 02/DV2 corresponds to a group interface code, i.e., 200B2101-200B2102-200B2103-200B2104. The group address code 03/DV3 corresponds to a group interface code, i.e., 200C2101-200C-2102-200C2103-200C2104. The group address code and corresponding interface matching code of each slave electronic device 200A (B, C) are designated in a group specification. The group specification is stored in the storage module 143 of the MCU 140, the MCUs 1114-1116 and the transceiver module 210 of each slave electronic device 200A (B, C).

When the function control software of the slave electronic devices 200A-200C is FW1, FW2, FW3, and the software matching codes of the slave electronic devices 200A-200C are 200A2104, 200B2104 and 200C2104, the function software codes are 200AFW1, 200BFW2 and 200CFW3. The MCU 140 of each master electronic device 100 A (B, C) has stored in advance the function software codes and OSD control interface software of all of the slave electronic devices 200A-200C in the fourth storage unit 1104. The interface icon of the function control software FW1, FW2, FW3 is 2104FW; then the software icons of the already stored function control software codes 200AFW1, 200BFW2 and 200CFW3 will be shown under the interface icon of 2104FW.

If the slave electronic device 200A is a television, the function control software FW1 is volume control, brightness control and channel control, the corresponding software code of the function control software FW1 is stored in the fourth storage unit 2104 of the slave electronic device 200A. If the slave electronic device 200B is a radio, the function control software FW2 is volume control and channel control, the corresponding software code of the function control software FW2 is stored in the fourth storage unit 2104 of the slave electronic device 200B. The fourth storage unit 2104 further stores therein the OSD control interface and operating system software of the slave electronic device 200A (B, C).

Figure 4:
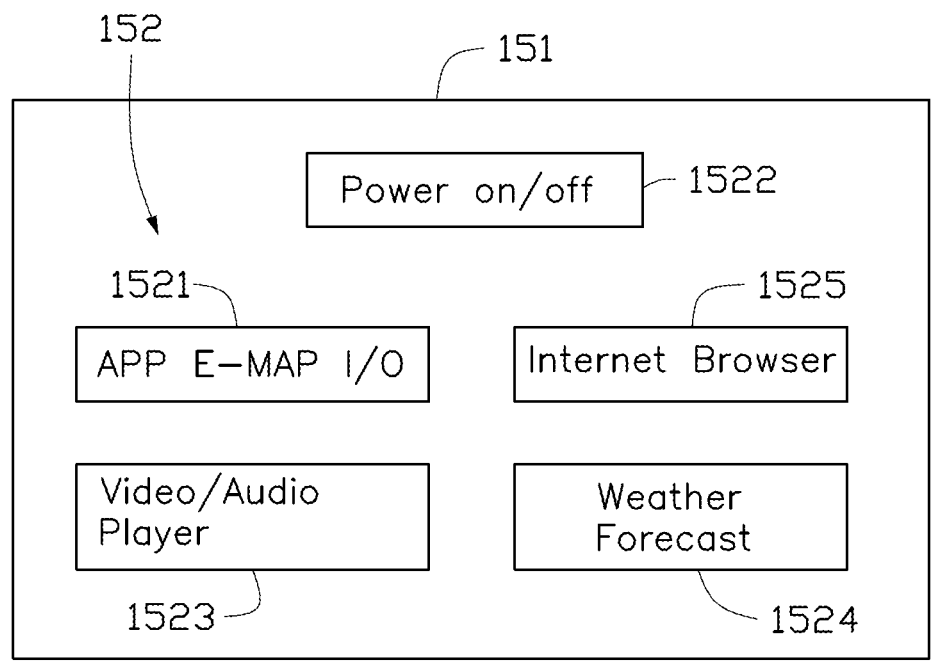
FIG. 4 is a first screenshot of a display screen of the master electronic device.
Figure 5:
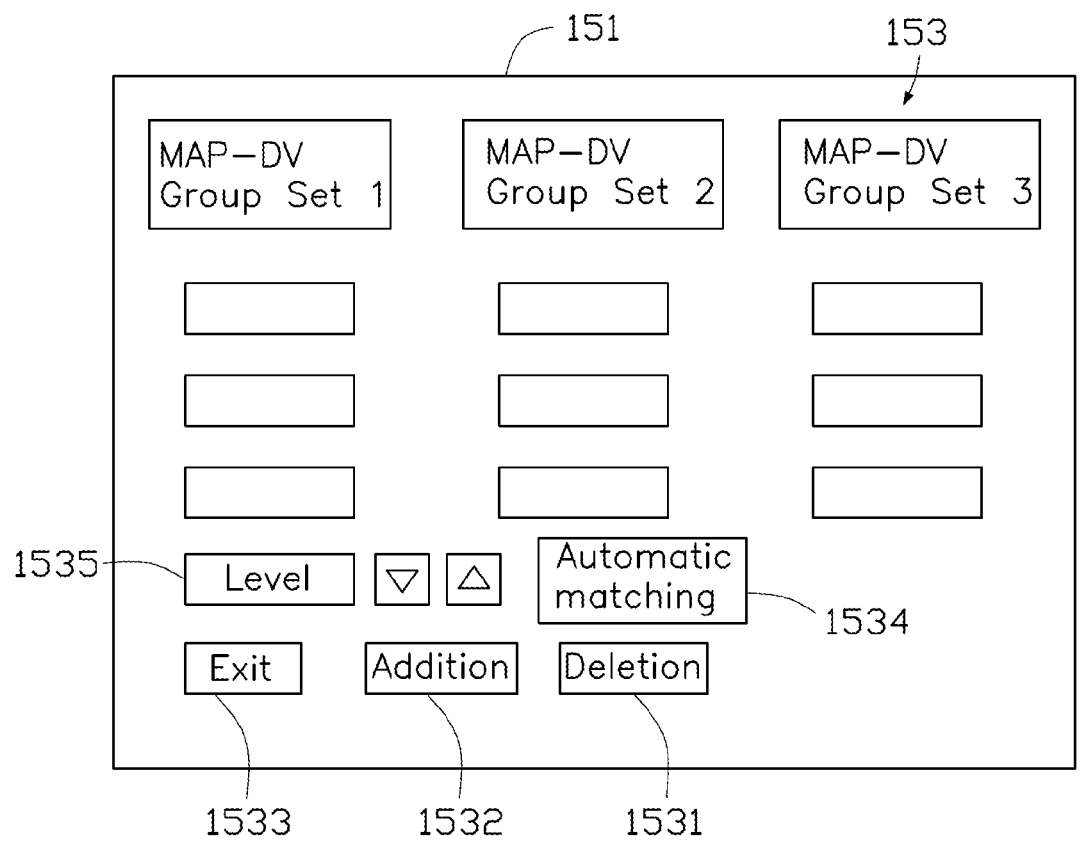
FIG. 5 is a second screenshot of the display screen of the master electronic device.
Figure 6:
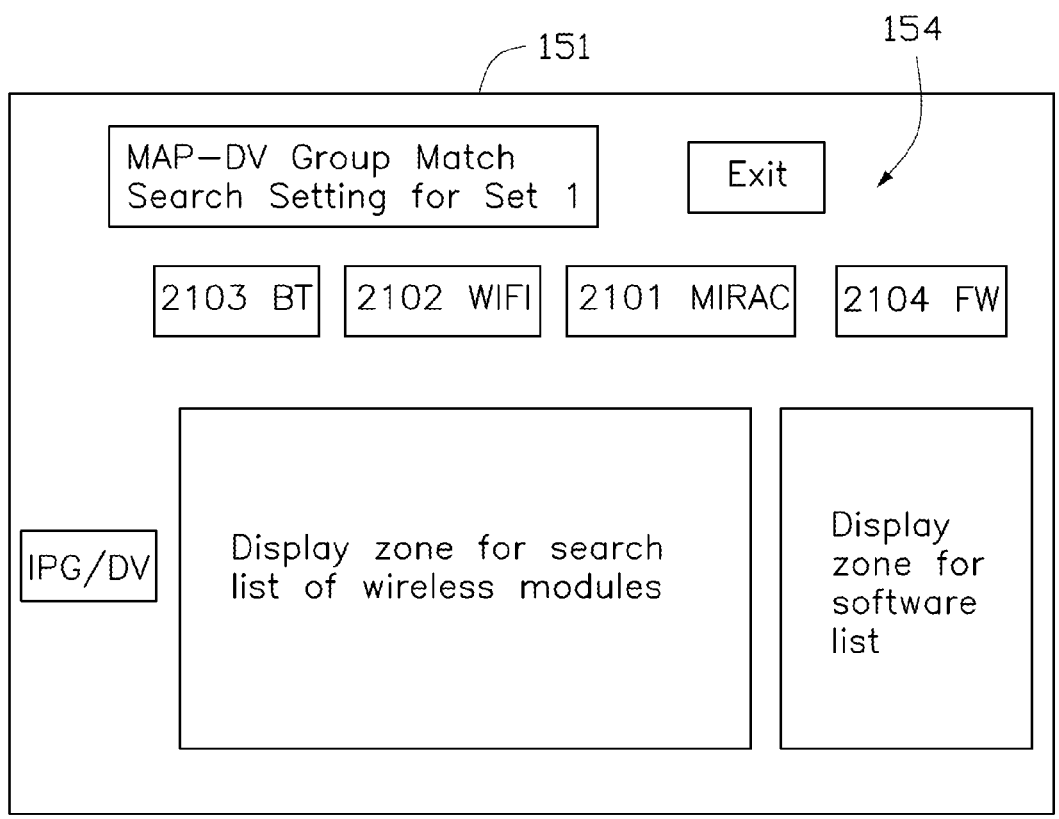
FIG. 6 is a third screenshot of the display screen of the master electronic device.
Figure 7:
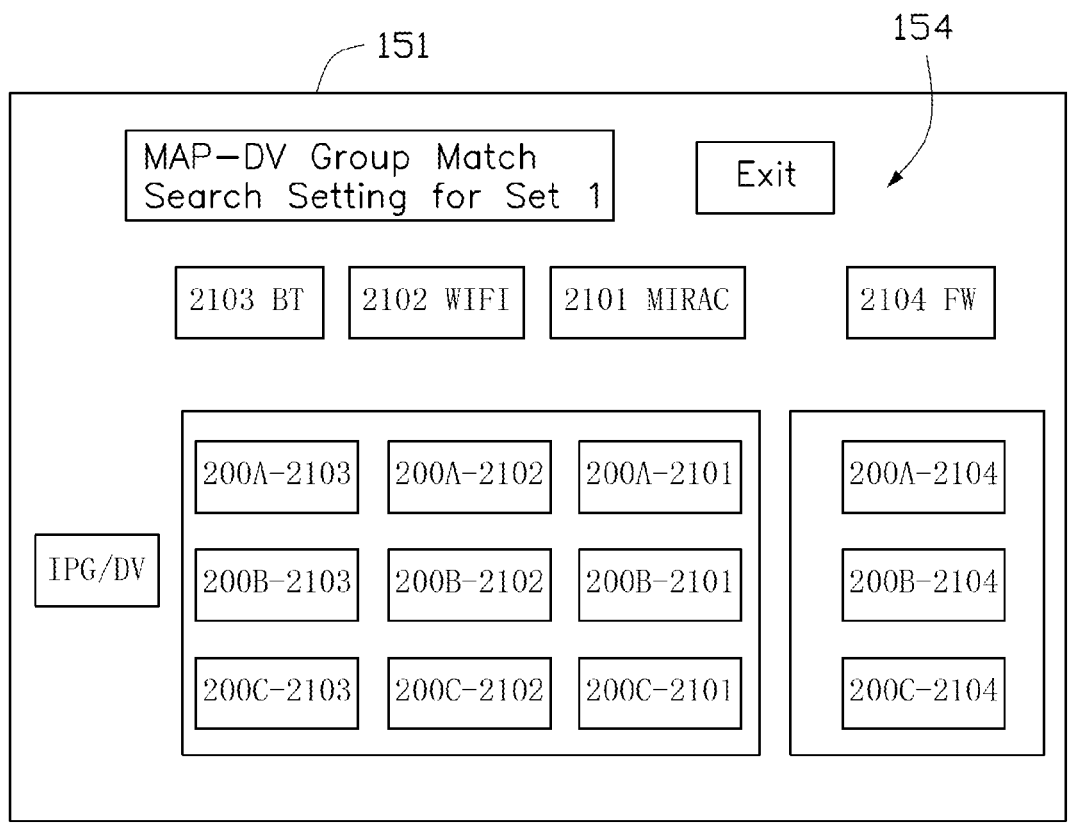
FIG. 7 is a fourth screenshot of the display screen of the master electronic device.
Figure 8:
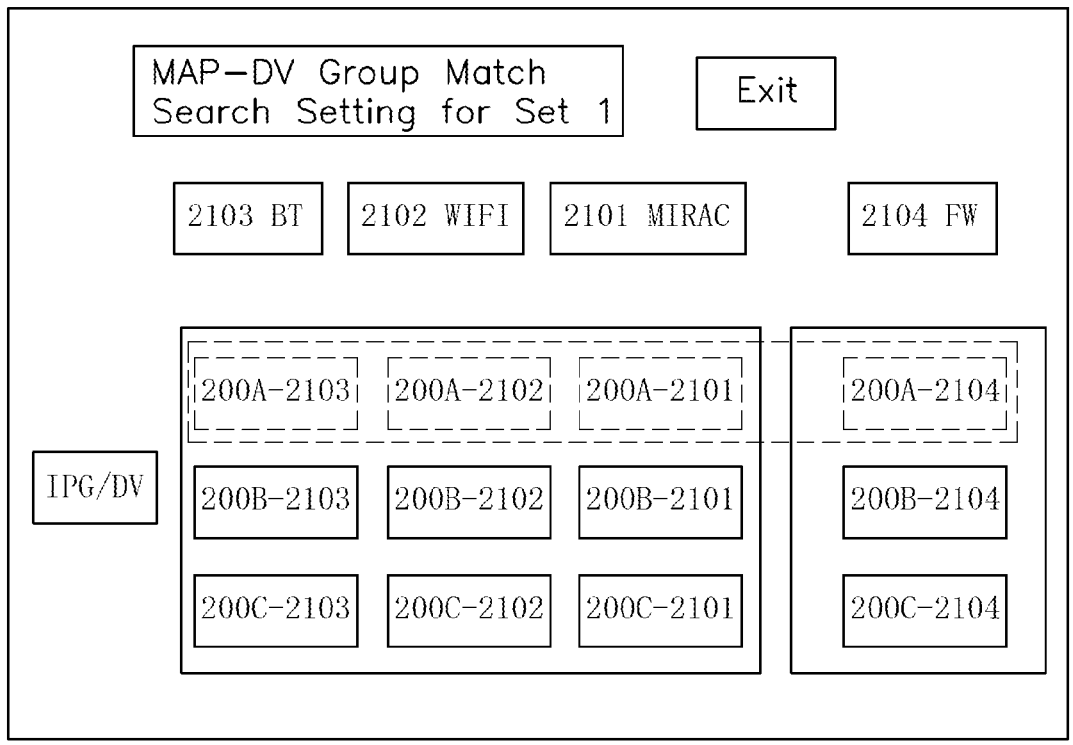
FIG. 8 is a fifth screenshot of the display screen of the master electronic device.
Figure 9:
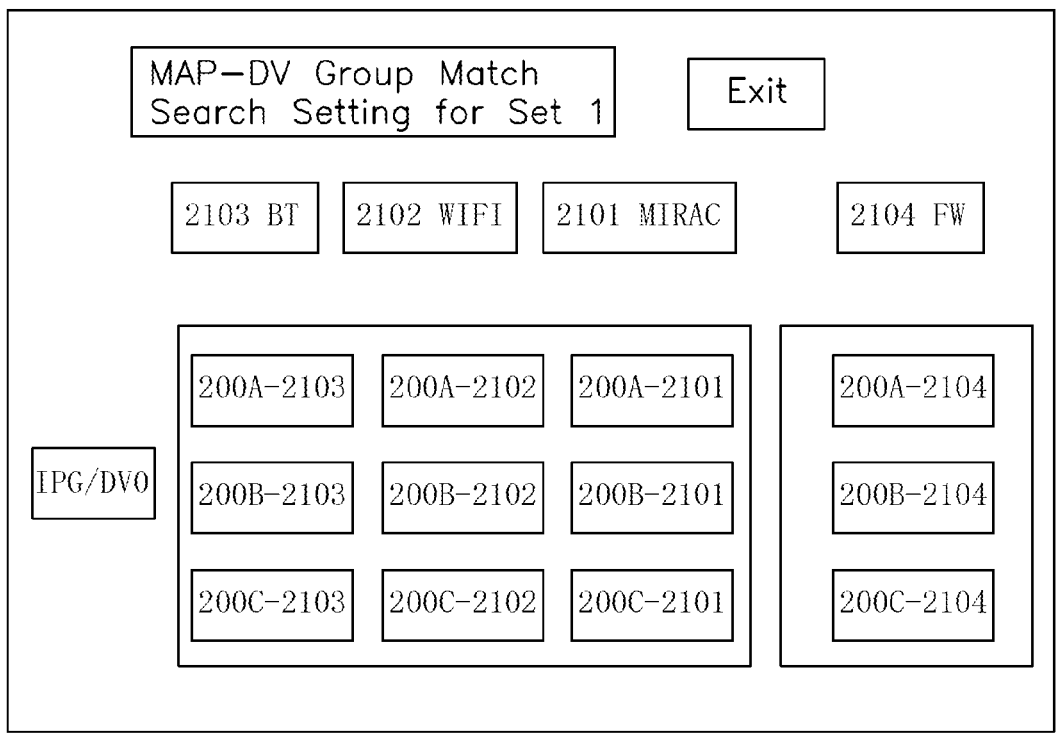
FIG. 9 is a sixth screenshot of the display screen of the master electronic device.
Figure 10:
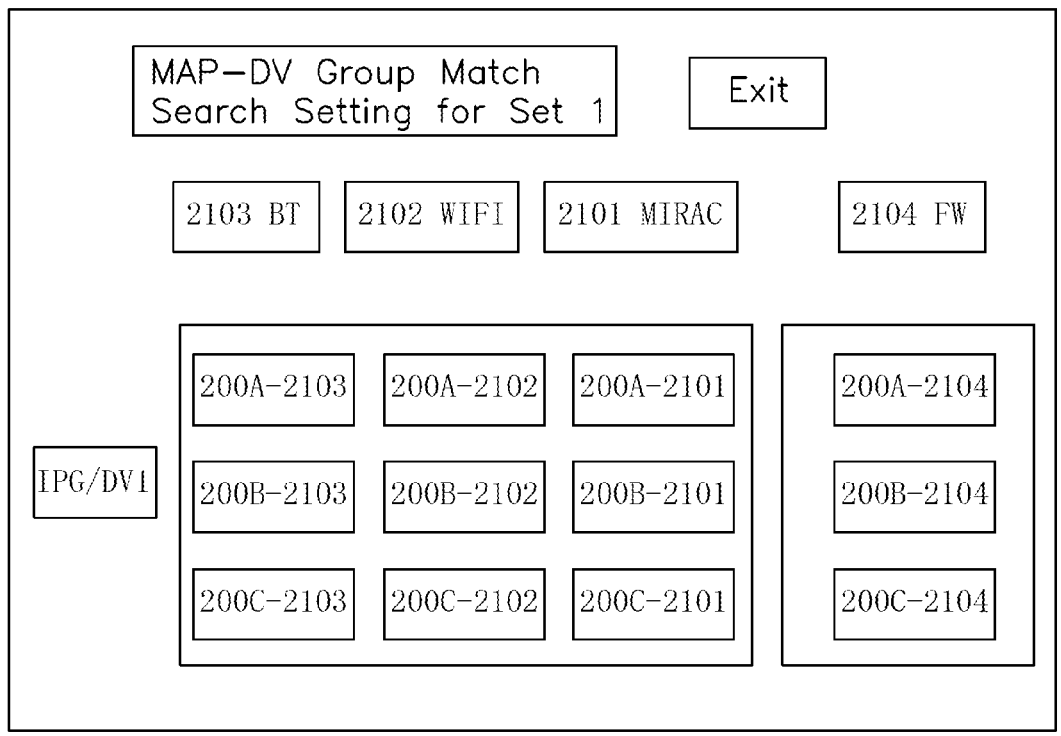
FIG. 10 is a seventh screenshot of the display screen of the master electronic device.

The different levels of the OSD interface include a first level of application interface level 152 as shown in FIG. 4, a second level of group matching main control level 153 as shown in FIG. 5, a third level of group matching search interface level 154 as shown in FIGS. 6-11 and a fourth level of slave electronic device coupling interface level. The application interface level 152 (i.e., first level) of FIG. 4 which is displayed by the display screen 151 of the master electronic device 100A (B, C) includes an application interface 1521, i.e., APP E-MAP I/O interface for initiation to enter a group matching procedure, a power on/off interface 1522 and other application interfaces such as video/audio player 1523, weather forecast 1524 and internet browser 1525. As shown in FIG. 5, the group matching main control level 153 (i.e., second level) is provided for executing deletion (MAP-delete) 1531, addition (MAP-add) 1532, exit 1533, automatic matching (Auto MAP) 1534 and movement of different levels (display up/down) 1535 of the slave electronic device group. In accordance with an embodiment, the display up/down means that the movement between any interface of the second level to the first level or the third level. Referring to FIGS. 6-11, the group matching search interface level 154 (i.e., third level) is used for displaying the different interfaces during the group matching, such as search interface and match interface. The slave electronic device coupling interface level (i.e., fourth level, not shown in the drawings) is used for showing connection or exit after that the group matching has been completed.

Figure 12:
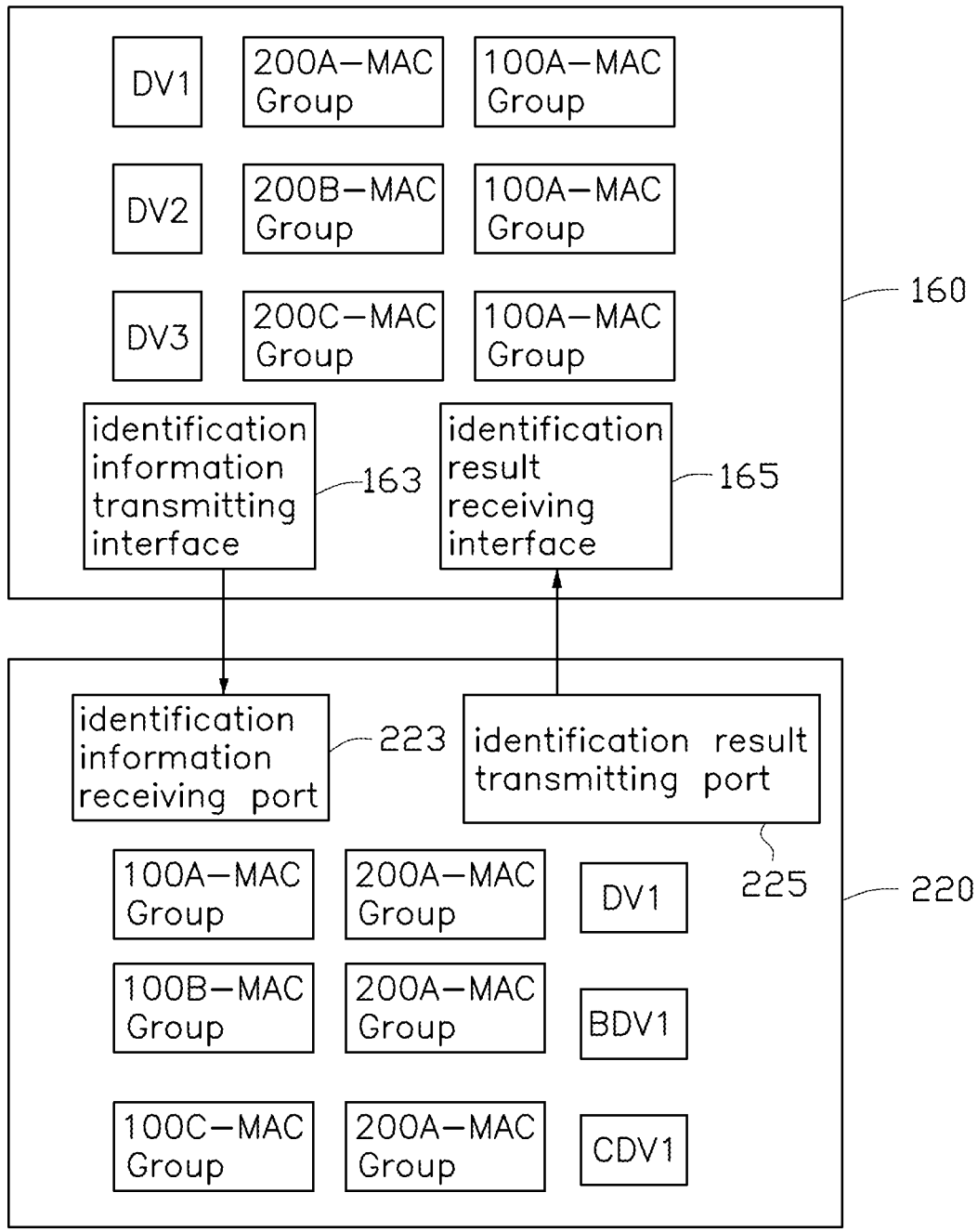
FIG. 12 is a diagrammatic view showing a first connection mode between an identification module of the master electronic device of FIG. 1 and an identification module of the slave electronic device of FIG. 2.

Referring to FIG. 12, taking the master and slave electronic devices 100A, 200A as example, the master electronic device 100A includes an identification module 160. The identification module 160 stores therein identification information for identifying the slave electronic device 200A, which includes the MAC code of the master electronic device 100A, i.e., 100A-MAC01(1101&1102&1103), the MAC code of the slave electronic device 200A, i.e., 200A-MAC01(2101&2102&2103), which matches with the master electronic device 100A, and the group address code DV1 corresponding to the MAC codes of the master and slave electronic devices 100A, 200A. The MAC code of the master electronic device 100A, i.e., 100A-MAC01 (1101&1102&1103) is made up of the MAC codes of the wireless modules 1101, 1102, 1103 of the master electronic device 100A, i.e., 1101 (MAC code), 1102 (MAC code) and 1103 (MAC code). The MAC code of the slave electronic device 200A, i.e., 200A-MAC01(2101&2102&2103) is made up of the MAC codes of the wireless modules 2101, 2102, 2103 of the slave electronic device 200A, i.e., 2101 (MAC code), 2102 (MCA code) and 2103 (MAC code).

When the master electronic device 100A matches with the slave electronic devices 200A-200C successfully, then the identification information stored in the identification module 160 is serial matching identification codes which are: (200A2101-200A2102-200A2103)-(100A1101-100A1102-100A1103), (200B2101-200B2102-200B2103)-(100A1101-100A1102-100A1103), and (200C2101-200C2102-200C2103)-(100A1101-100A1102-100A1103). 200A2101-200A2102-200A2103 is group interface matching code of the slave electronic device 200A. 200B2101-200B2102-200B2103 is group interface matching code of the slave electronic device 200B. 200C2101-200C2102-200C2103 is group interface matching code of the slave electronic device 200C. 100A1101-100A1102-100A1103 is group interface matching code of the master electronic device 100A.

Figure 13:
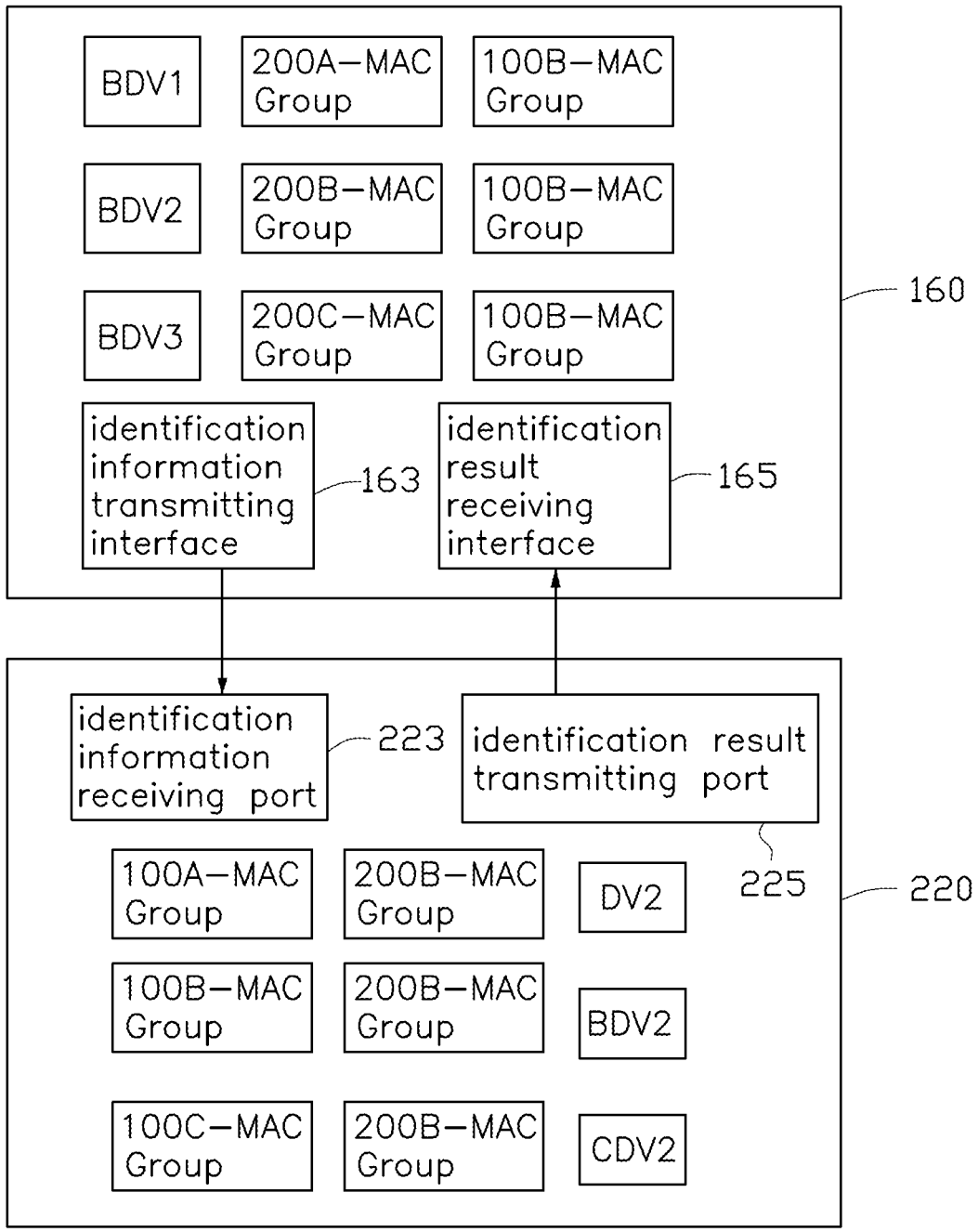
FIG. 13 is a diagrammatic view showing a second connection mode between the identification module of the master electronic device of FIG. 1 and the identification module of the slave electronic device of FIG. 2.

Similar to the master electronic device 100A, as shown in FIG. 13, the master electronic device 100B includes an identification module 160. The identification module 160 stores therein identification information for identifying the slave electronic devices such as the MAC code of the master electronic device 100B, the MAC code of the slave electronic device matching with the master electronic device, and the group address code corresponding to the MAC codes of the master/slave electronic devices. When the master electronic device 100B matches with the slave electronic devices 200A-200C, then the identification information stored in the identification module 160 is serial matching identification codes which are: (200A2101-200A2102-200A2103)-(100B1101-100B1102-100B1103), (200B2101-200B2102-200B2103)-(100B1101-100B1102-100B1103), and (200C2101-200C2102-200C2103)-(100B1101-100B1102-100B1103). 100B1101-100B1102-100B1103 is group matching interface code of the master electronic device 100B.

Figure 14:
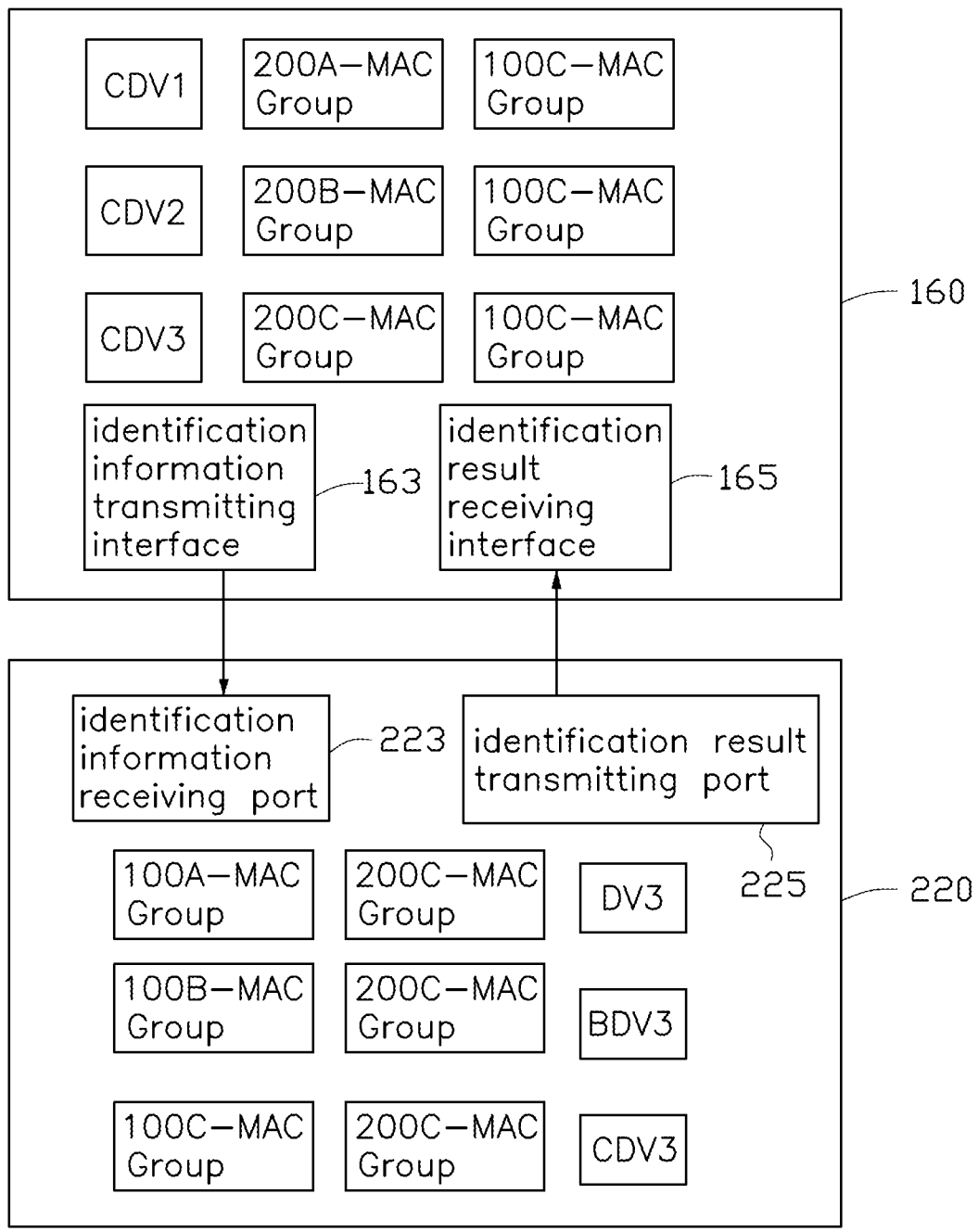
FIG. 14 is a diagrammatic view showing a third connection mode between an identification module of the master electronic device of FIG. 1 and an identification module of the slave electronic device of FIG. 2.

Similar to the master electronic device 100A, as shown in FIG. 14, the master electronic device 100C includes an identification module 160. The identification module 160 stores therein identification information for identifying the slave electronic devices such as the MAC code of the master electronic device 100C, the MAC code of the slave electronic device matching with the master electronic device, and the group address code corresponding to the MAC codes of the master/slave electronic devices. When the master electronic device 100C matches with the slave electronic devices 200A-200C then the identification information stored in the identification module 160 is serial matching identification codes which are: (200A2101-200A2102-200A2103)-(100C1101-100C1102-100C1103), (200B2101-200B2102-200B2103)-(100C1101-100C1102-100C1103), and (200C2101-200C2102-200C2103)-(100C1101-100C1102-100C1103). 100C1101-100C1102-100C1103 is group interface matching code of the master electronic device 100C. Such serial matching identification codes can be sent out of the master electronic device 100A (B, C) by the identification information transmitting interface 163 thereof.

The slave electronic device 200A further comprises an identification module 220. As shown in FIG. 12, the identification module 220 stores therein identification information for identifying the master electronic devices, such as the MAC code of the slave electronic device, i.e., 200A-MAC01 (2101&2102&2103) and group address code DV1 of the master electronic device matching with the slave electronic device 200A. Taking an example when the slave electronic device 200A matches with the master electronic devices 100A-100C successfully, the identification information stored in the identification module 220 is serial matching identification codes which are: (200A2101-200A2102-200A2103)-(100A1101-100A1102-100A1103), (200A2101-200A2102-200A2103)-(100B1101-100B1102-100B1103), and (200A2101-200A2102-200A2103)-(100C1101-100C1102-10001103). 200A2101-200A2102-200A2103 is group interface matching code of the slave electronic device 200A. 100A1101-100A1102-100A1103 is group interface matching code of the master electronic device 100A. 100B1101-100B1102-100B1103 is group interface matching code of the master electronic device 100B. 100C1101-100C1102-100C1103 is group interface matching code of the master electronic device 1000.

Similar to the slave electronic device 200A, referring to FIG. 13, the slave electronic device 200B further comprises an identification module 220. The identification module 220 stores therein identification information for identifying the master electronic devices, such as the MAC code of the slave electronic device, i.e., 200B-MAC01 (2101&2102&2103), group address code BDV1 of the master electronic device matching with the slave electronic device 200B, and the MAC code of the master electronic device matching with the slave electronic device 200B. Taking an example when the slave electronic device 200B matches with the master electronic devices 100A-100C successfully, the identification information stored in the identification module 220 is serial matching identification codes which are: (200B2101-200B2102-200B2103)-(100A1101-100A1102-100A1103), (200B2101-200B2102-200B2103)-(100B1101-100B1102-100B1103), and (200B2101-200B2102-200B2103)-(100C1101-100C1102-100C1103). 200B2101-200B2102-200B2103 is group interface matching code of the slave electronic device 200B.

Similar to the slave electronic device 200A, referring to FIG. 14, the slave electronic device 200C further comprises an identification module 220. The identification module 220 stores therein identification information for identifying the master electronic devices, such as the MAC code of the slave electronic device, i.e., 200C-MAC01 (2101&2102&2103), group address code CDV1 of the master electronic device matching with the slave electronic device 200C, and the MAC code of the master electronic device matching with the slave electronic device 200C. Taking an example when the slave electronic device 200C matches with the master electronic devices 100A-100C successfully, the identification information stored in the identification module 220 is serial matching identification codes which are: (20002101-200C2102-200C2103)-(100A1101-100A1102-100A1103), (20002101-200C2102-200C2103)-(100B1101-100B1102-100B1103), and (200C2101-20002102-200C2103)-(100C1101-100C1102-10001103). 200C2101-200C2102-200C2103 is group interface matching code of the slave electronic device 200C.

Figure 15:
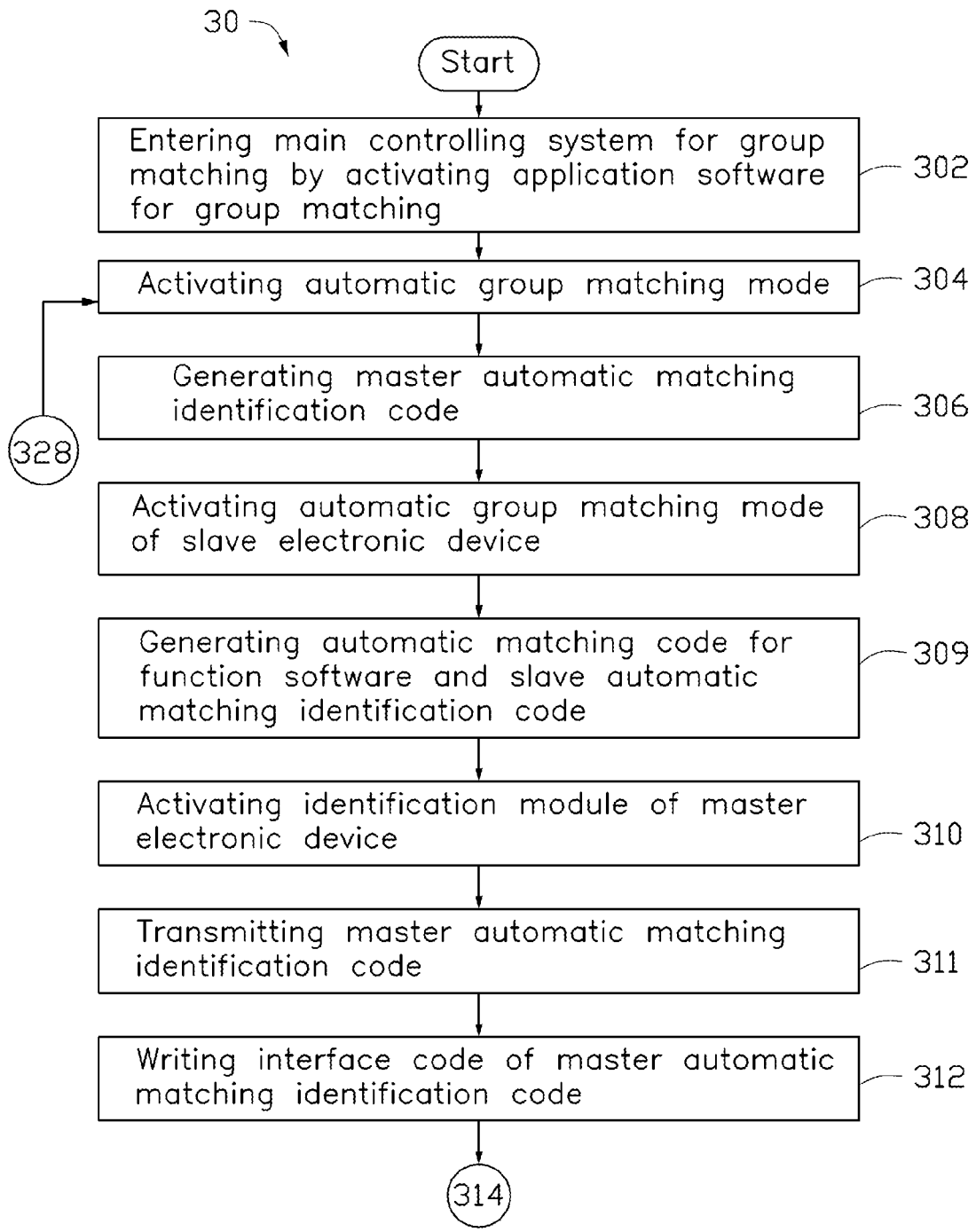
FIGS. 15-17 are a flow chart of a matching method in accordance with the present disclosure.
Figure 16:
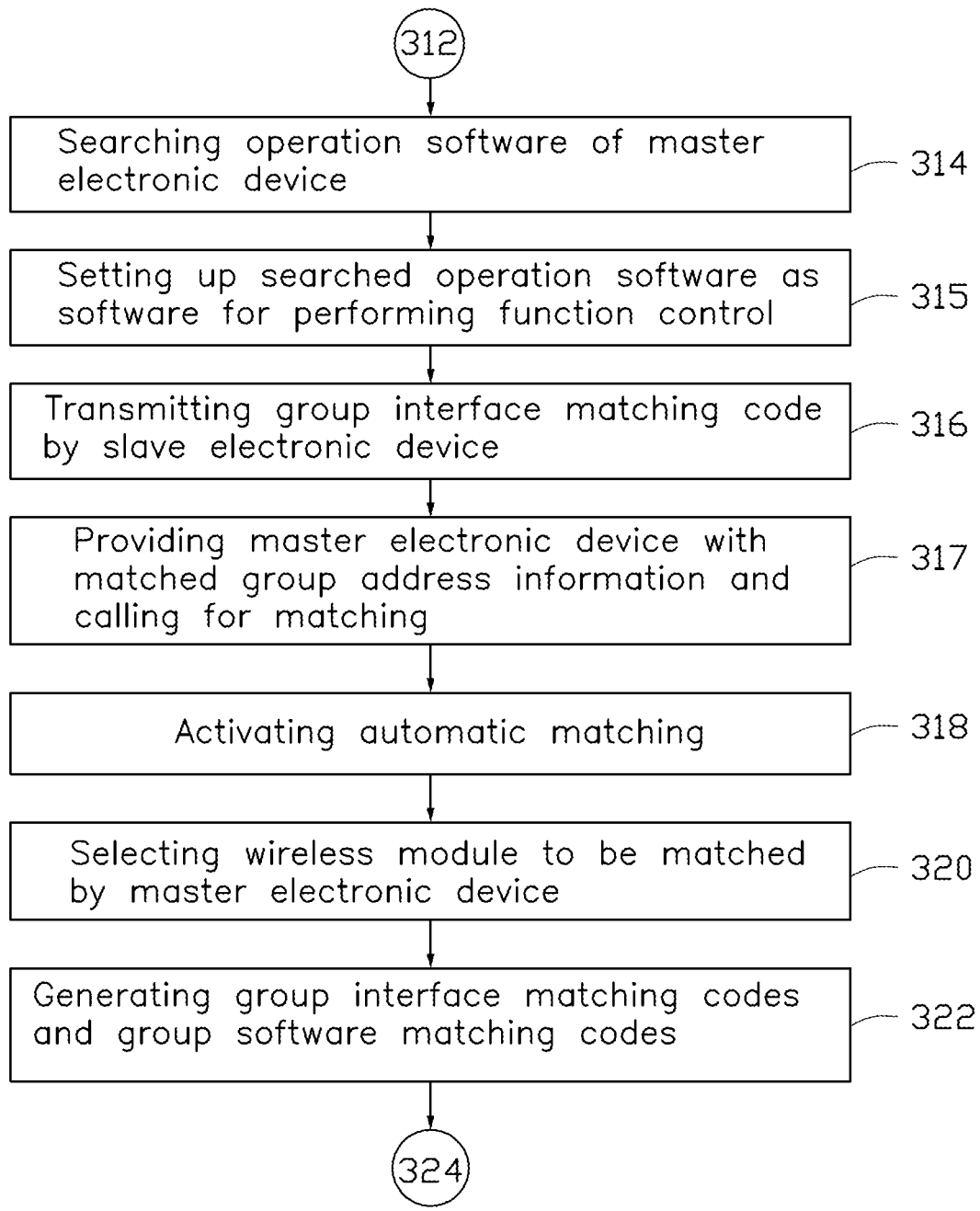
Figure 17:
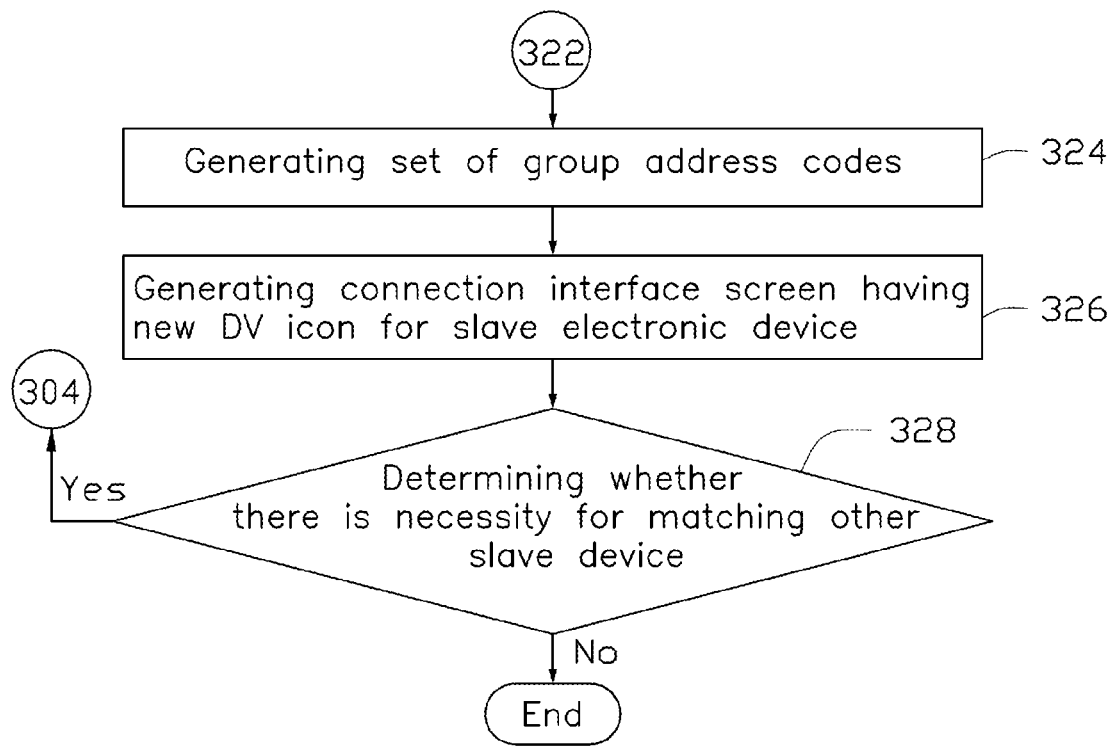

Referring to FIGS. 15-17, a flowchart is presented in accordance with an example embodiment. The example method 30 is provided by way of example, as there are a variety of ways to carry out the method. The method 30 described below can be carried out using the configurations illustrated in FIGS. 1-14, for example, and various elements of these figures are referenced in explaining example method 30. Each block shown in FIGS. 15-17 represents one or more processes, methods or subroutines, carried out in the example method 30. Furthermore, the illustrated order of blocks is illustrative only and the order of the blocks can change according to the present disclosure. Additional blocks can be added or fewer blocks may be utilized, without departing from this disclosure. The example method 30 is disclosed by taking the master electronic device 100A and the slave electronic device 200A for illustration. The example method 30 can begin at block 302.

Referring to FIG. 15, at block 302, group matching software is activated, whereby a user can enter the main control system of the group matching. At this moment, the MCU 140 of the master electronic device 100A detects that an interface of matching application software on the display screen 151 is activated (clicked) to start the operation of the group matching application software so that the user can enter the interface of the main control system of the group matching (also referring to FIGS. 4 and 5).

At block 304, the automatic group matching mode of the master electronic device 100A is started. The MCU 140 of the master electronic device 100A detects that the MAP-DV group interface and the automatic group matching interface are activated (clicked) to start the automatic group matching mode. The MAP-DV group interface is related to groups of slave electronic devices which have been classified such as school group, family group and office group. The user can choose the corresponding MAP-DV group according to the actual position of the slave electronic device to then start the automatic group matching mode. At block 304, some manipulations to the group can be performed after the entry into the main control system interface of the group matching, such as deletion of group, addition (MAP-add) of group, exit of the main control system or movement between different levels.

At block 306, a master automatic matching identification code for each of the wireless modules 1101, 1102, 1103 of the master electronic device 100A is generated.

At block 308, the automatic group matching mode of the slave electronic device 200A is activated. The activation can be achieved by pressing a key (hard key or soft key) of the slave electronic device 200A for automatic group matching or brining the master electronic device 100A near the slave electronic device 200A. In response to the activation, at block 309, a function software automatic matching code and an automatic map code for the wireless module 2101, 2102, 2103 of the slave electronic device 200A is generated. The MCU 221 combines the automatic map code 10000000 therein and the function software matching code 200A2104 in the fourth storage unit 2104 together to generate the function software automatic matching code 10000000-200A2104. The MCU 221 combines the automatic map code 10000000 therein and the interface matching codes in the wireless modules 2101, 2102, 2103 together to generate slave automatic matching identification codes for the wireless modules 2101, 2102, 2103 of the slave electronic device 200A: (10000000-200A2101)-(10000000-200A2102)-(10000000-200A2103).

At block 310, the MCU 140 activates the identification module 160 of the master electronic device 100A. At block 311, the MCU 140 sends out the master automatic matching identification codes for the wireless modules through the identification information transmitting interface 163. Thereafter, the identification result receiving interface 165 receives identification result sent from the slave electronic device 200A.

At block 312, every interface codes 100A1101, 100A1102 and 100A1103 in the master automatic matching identification codes of the master electronic device 100A are written into the corresponding wireless modules 2101, 2102, 2103 of the slave electronic device 200A.

Referring to FIG. 16, at block 314, the master electronic device 100A searches corresponding operation software in the fourth storage unit 1104 in accordance with the function software automatic matching code sent from the slave electronic device 200A. At block 315, the master electronic device 100A designates the corresponding operation software, if any, as the software for performing function control for the slave electronic device 200A.

At block 316, the MCU 221 activates the wireless modules 2101-2103 of the slave electronic device 200A according to the master automatic matching identification codes for the wireless modules 1101-1103 to send out the group interface matching code of the slave electronic device. At block 317, the MCU 221 provides the wireless modules 1101-1103 of the master electronic device 100A with matching group address information and to perform calling for matching. In accordance with the preferred embodiment, the function software automatic matching code 10000000-200A2104 can be sent out by the wireless modules to perform calling for matching, or can be sent out by NFC to perform calling for matching.

At block 318, the automatic matching between the master electronic device 100A and the slave electronic device 200A is activated.

At block 320, the master electronic device sequentially selects the wireless modules to be matched to complete the matching process. When the wireless module 1101 of the master electronic device 100A matches with the wireless module 2101 of the slave electronic device 200A, the MCU 140 of the master electronic device reads the MAC address code 200A2101 of the wireless module of the slave electronic device, and saves the code 200A2101 into the first storage unit 1121 of the wireless module 1101 of the master electronic device 100A. The MCU 140 detects that the icon for the wireless module 2101 on the OSD of the MAP DV group matching, searching interface level no more flickers but constantly lights to indicate that the matching between the two wireless modules 1101, 2101 has been completed. When the wireless module 1102 of the master electronic device matches with the wireless module 2102 of the slave electronic device, the MCU 140 of the master electronic device reads the MAC address code 200A2102 of the wireless module of the slave electronic device, and saves the code 200A2102 into the first storage unit 1121 of the wireless module 1102 of the master electronic device. The MCU 140 detects that the icon for the wireless module 2102 no more flickers but constantly lights to indicate that the matching between the two wireless modules 1102, 2102 has been completed. When the wireless module 1103 of the master electronic device matches with the wireless module 2103 of the slave electronic device, the MCU 140 of the master electronic device reads the MAC address code 200A2103 of the wireless module of the slave electronic device, and saves the code 200A2103 into the first storage unit 1121 of the wireless module 1103 of the master electronic device. The MCU 140 detects that the icon for the wireless module 2103 no more flickers but constantly lights to indicate that the matching between the two wireless modules 1103, 2103 has been completed. When the software module of the master electronic device matches with the software module of the slave electronic device, the MCU 140 of the master electronic device reads the MAC address code 200A2104 of the software module of the slave electronic device, and saves the code 200A2104 into the fourth storage unit 1104 of the master electronic device. The MCU 140 detects that the icon for the software module no more flickers but constantly lights to indicate that the matching between the two software modules has been completed.

At block 322, the group interface matching codes for the master and slave electronic devices 100A, 200A and the software group matching codes for the master and slave electronic devices 100A, 200A are generated. The group interface matching code for the master electronic device is 100A1101-100A1102-100A1103. The group interface matching code for the slave electronic device is 200A2101-200A2102-200A2103. The group software matching code for the master electronic device is 100A1104. The group software matching code for the slave electronic device is 200A2104.

Referring to FIG. 17, at block 324, a set of group address codes are generated.

At block 326, a slave electronic device connection interface screen having a new DV code is generated.

At block 328, the master electronic device determines whether there is a need to find out another slave electronic device for matching.

Figure 18:
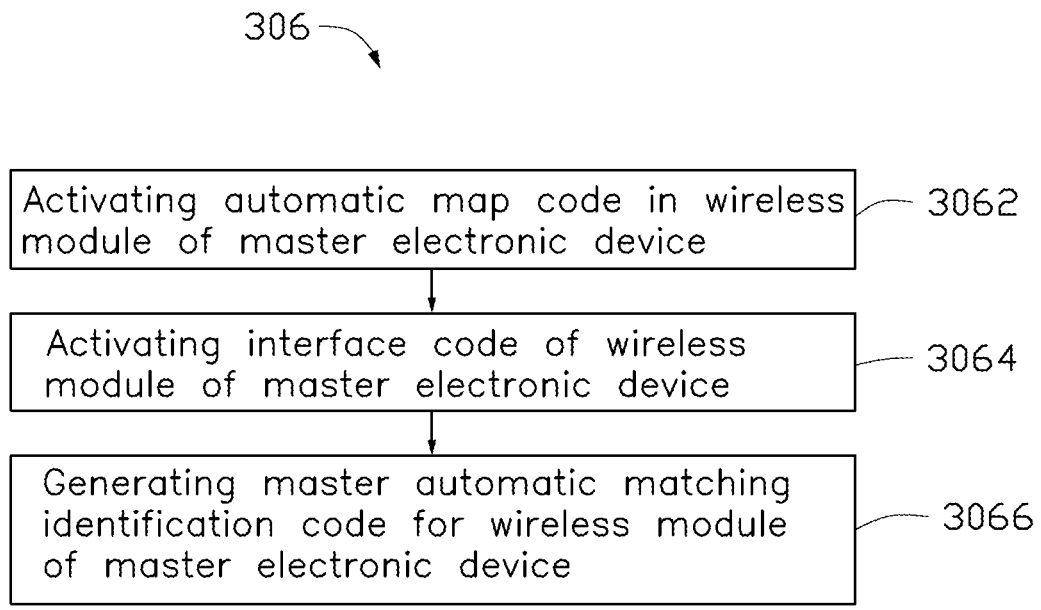
FIG. 18 is a flow chart showing sub-blocks of block 306 of the matching method of FIGS. 15-17.

Referring to FIG. 18, block 306 includes sub-blocks 3062, 3064, 3066. At sub-block 3062, the MCU 140 activates the automatic map code 10000000 in the third storage units 1125 of the wireless modules 1101, 1102, 1103.

At sub-block 3064, the MCU 140 activates the MAC address code in the first storage unit 1121 of the wireless module 1101 the MAC address code in the first storage unit 1121 of the wireless module 1102 and the MAC address in the first storage unit 1121 of the wireless module 1103 of the master electronic device 100A.

At sub-block 3066, the MCU 140 combines the MAC address codes and the automatic map code to generate the master automatic matching identification codes for the wireless modules 1101, 1102, 1103: (10000000-100A1101)-(10000000-100A1102)-(10000000-100A1103).

Figure 19:
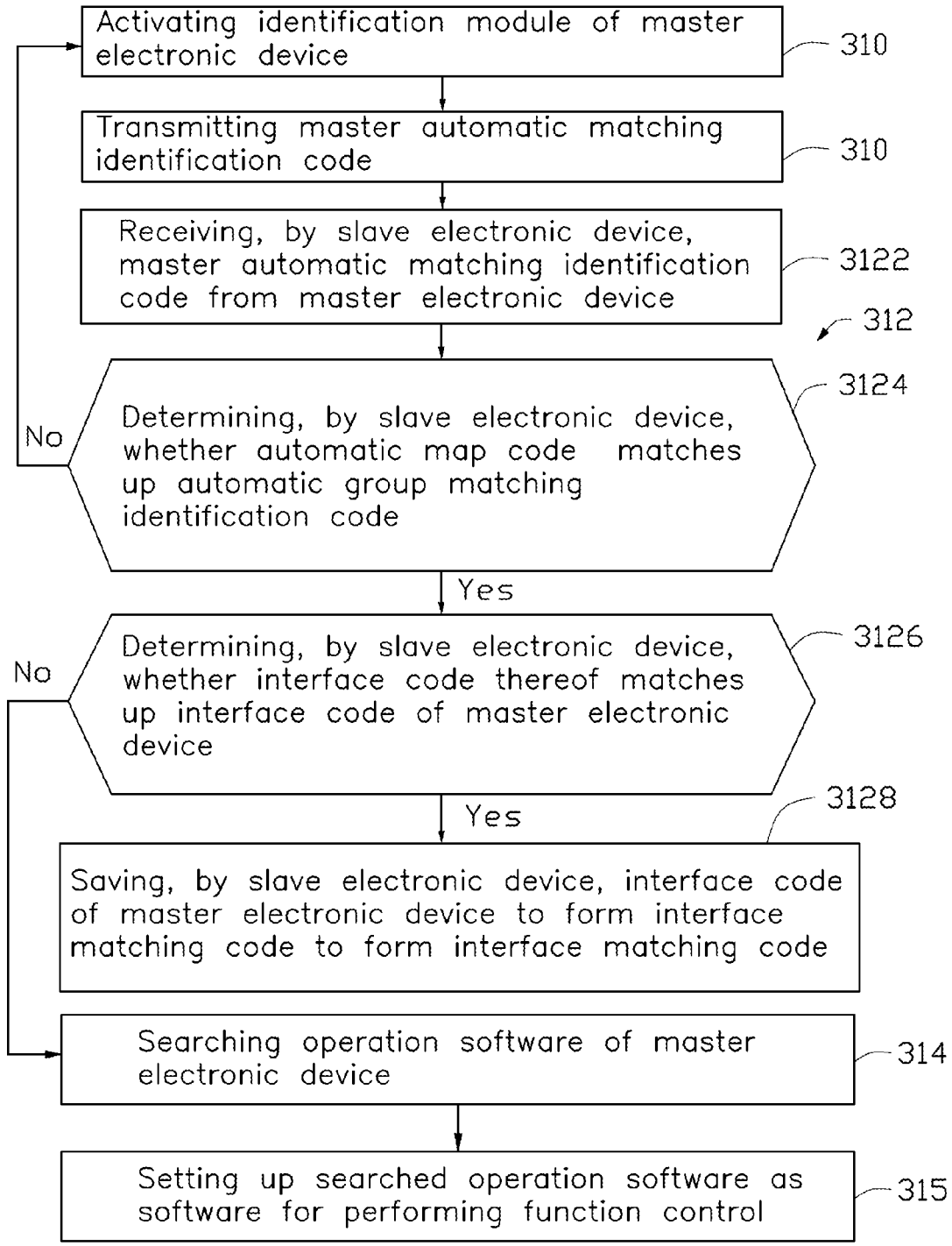
FIG. 19 is a flow chart showing sub-blocks of block 312 the matching method of FIGS. 15-17.

Referring to FIG. 19, block 312 includes sub-blocks 3122, 3124, 3126, 3128. At sub-block 3122, an identification information receiving port 223 receives the master automatic matching identification codes for the wireless modules 1101, 1102, 1103 from the identification information transmitting interface 163.

At sub-block 3124, the MCU 221 decides whether the automatic map code 10000000 in the master automatic matching identification codes for the wireless modules meets the automatic map code 10000000 in the third storage units 2125 of the slave electronic device 200A. If the answer is yes, the method 30 flows to sub-block 3126; if no the method 30 flows to block 310.

At sub-block 3126, the MCU 221 decides whether the interface codes in the corresponding master and slave automatic matching identification codes for the wireless modules 2101 and 1101, i.e., 200A2101 and 100A1101 meet each other, whether the interface codes in the corresponding wireless modules 2102 and 1102, i.e., 200A2102 and 100A1102 meet each, and whether the interface codes in the corresponding wireless modules 2103 and 1103, i.e., 200A2103 and 100A1103 meet each other. If yes, the method 30 flows to sub-block 3128. If no, the method 30 flows to block 314.

At sub-block 3128, the code 100A1101 is saved into the first storage unit 2121 of the wireless module 2101. The code 100A1102 is saved in the first storage unit 2121 of the wireless module 2102. The code 100A1102 is saved into the first storage unit 2121 of the wireless module 2103.

Figure 20:
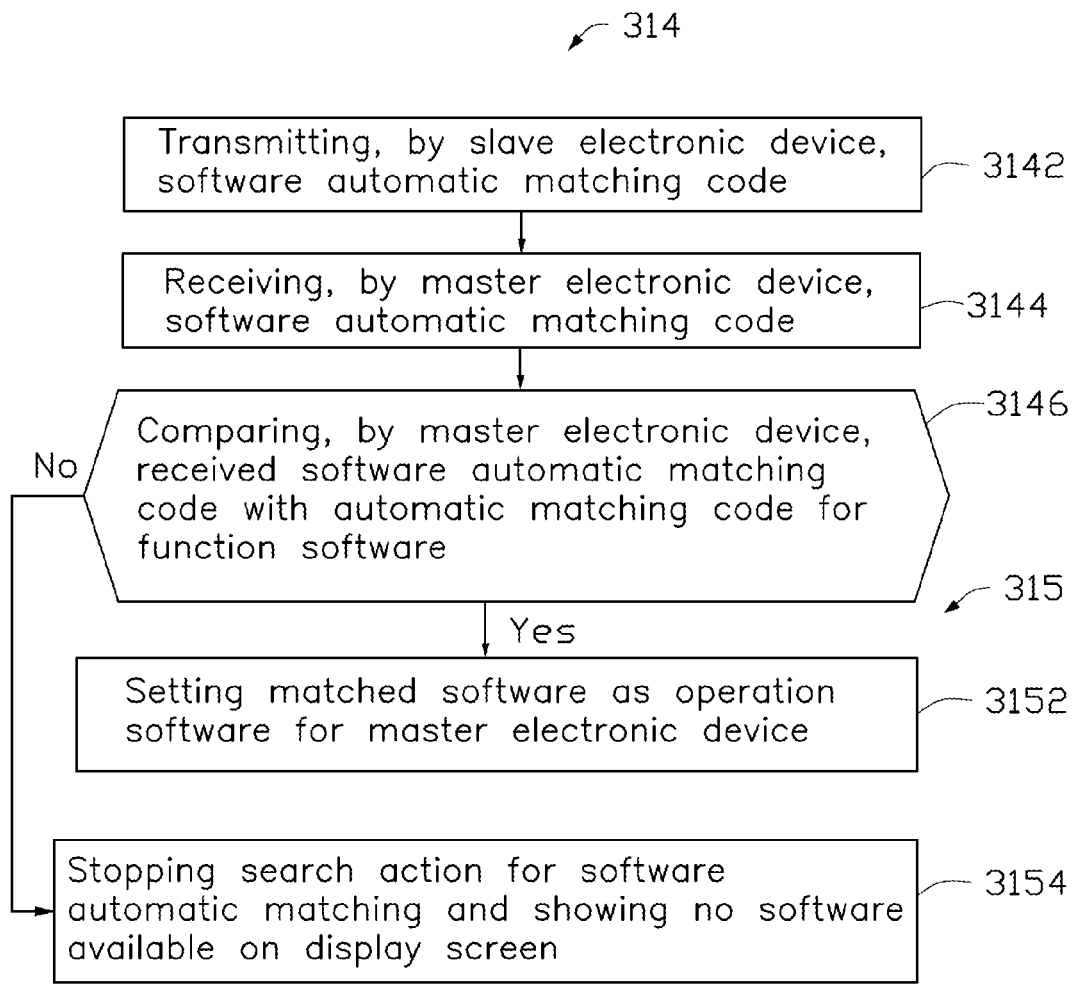
FIG. 20 is a flow chart showing sub-blocks of blocks 314 and 315 of the matching method of FIGS. 15-17.

Referring to FIG. 20, block 314 includes sub-blocks 3142, 3144, 3146 and block 315 includes sub-blocks 3152, 3154. At sub-block 3142, the MCU 221 sends out the function software automatic matching code 10000000-200A2104 via the transmitting module of an identification result transmitting port 225.

At sub-block 3144, the identification result receiving interface 165 receives the function software automatic matching code 10000000-200A2104 sent from the identification result transmitting port 225 and sends the code to the MCU 140 of the master electronic device 100A.

At sub-block 3146, the MCU 140 of the master electronic device 100A compares one-by-one the received code 100000000-200A2104 and the codes 10000000-200A2104, 10000000-200B2104 and 100000000-200C2104 which have been stored in the master electronic device in advance to see whether there is any match between the received code and the pre-stored codes. If there is a match, at sub-block 3152, the MCU 140 sets up the software of 200A2104 of 10000000-200A2104 as the operation software of the master electronic device 100A for controlling operation of the slave electronic device 200A; thereafter, the method 30 flows to block 316. If there is no match, at sub-block 3154, the searching for function software automatic matching is stopped and "No Software Available" is shown on the display screen 151 by the MCU 140; thereafter, the method 30 flows to block 316.

Figure 21:
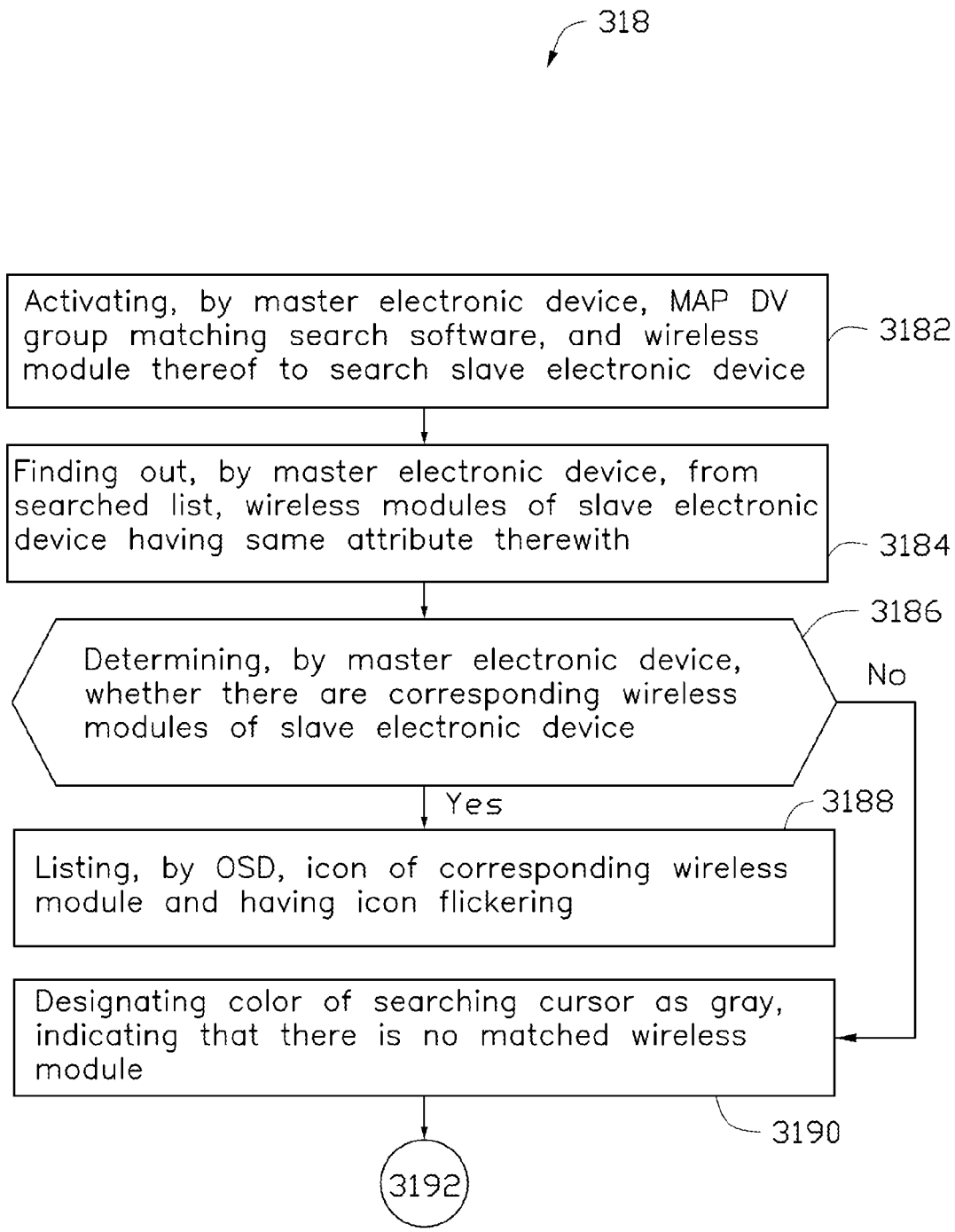
FIGS. 21-22 are related to a flow chart showing sub-blocks of blocks 318 and 320 of the matching method of FIGS. 15-17.
Figure 22:
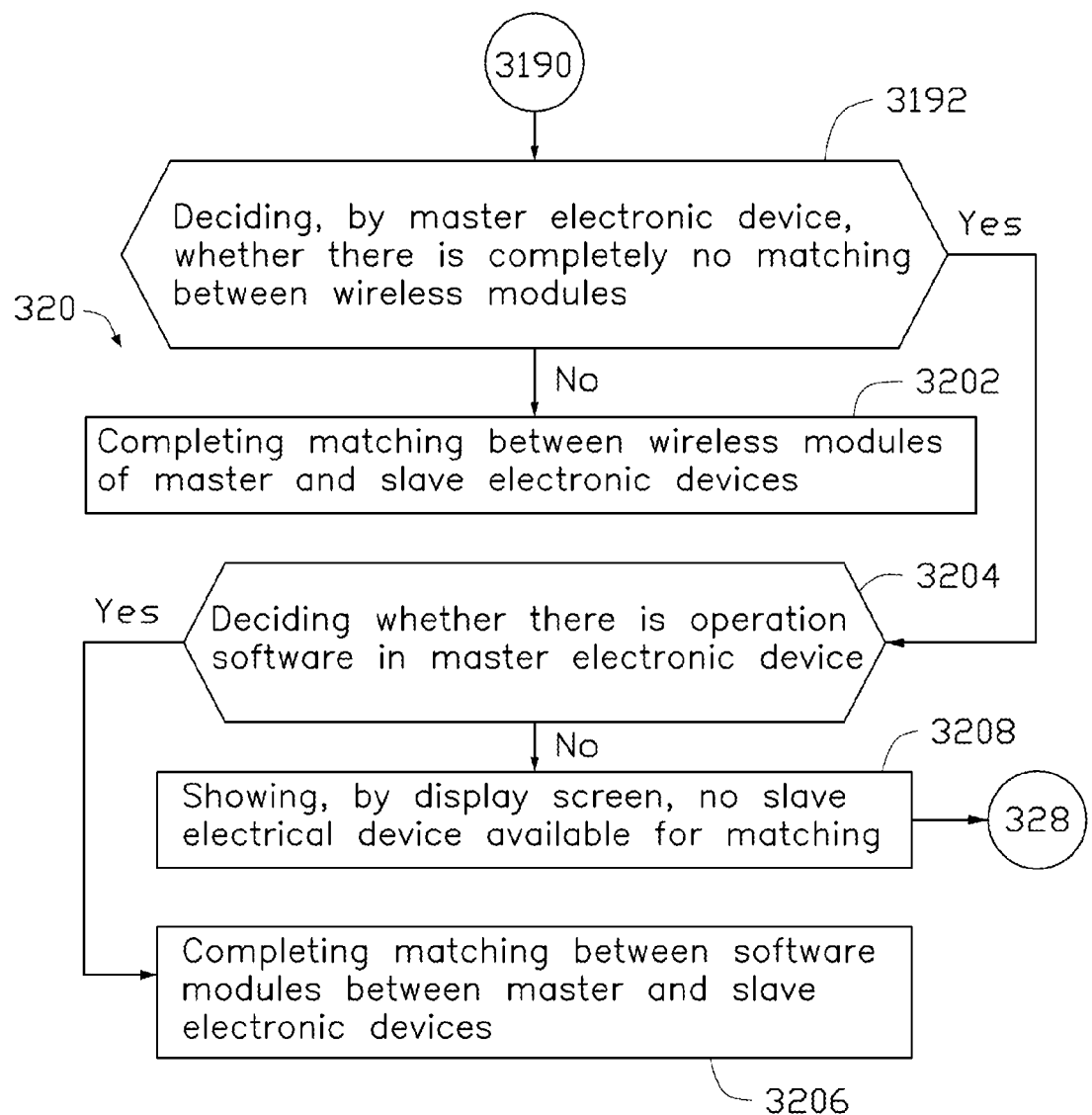

Referring to FIGS. 21-22, block 318 includes sub-blocks 3182, 3184, 3188, 3190, 3192 and block 320 includes sub-blocks 3202, 3204, 3206, 3208. At sub-block 3182, the MCU 140 activates the group matching searching software of MAP DV and asks the automatic map code 10000000 for the wireless module to activate the wireless modules 1101-1103 of the master electronic device 100A to call for and search the wireless modules 2101-2103 of the slave electronic device which has the automatic map code 10000000. Such slave electronic devices having the matched wireless modules 2101-2103 are listed.

At sub-block 3184, the master electronic device 100A finds out, from the searched list of the slave electronic devices, the wireless modules of the slave electronic devices having the same attribute therewith (i.e., those having the automatic map code of 10000000), and lists such wireless modules on a searched list display region for the wireless modules 2101-2103 of OSD of group matching searching interface. Group matching connections will be performed thereafter (also referring to FIGS. 6 and 7).

At sub-block 3186, the master electronic device decides whether there are corresponding wireless modules of the slave electronic device to the wireless modules of the master electronic device. If the answer is positive, the method 30 goes to sub-block 3188, and if the answer is negative the method 30 goes to sub-block 3190.

At sub-block 3188, the MCU 140 of the master electronic device searches for the wireless module 2101. The MCU 140 makes the OSD list icon of the wireless module 2101 in MAP DV group matching searching interface level and makes the icon enter a flickering status for searching, comparing and matching (also referring to FIG. 8). The MCU 140 of the master electronic device searches for the wireless module 2102. The MCU 140 makes the OSD list icon of the wireless module 2102 in MAP DV group matching searching interface level and makes the icon enter a flickering status for searching, comparing and matching (also referring to FIG. 9). The MCU 140 of the master electronic device searches for the wireless module 2103. The MCU 140 makes the OSD list icon of the wireless module 2103 in MAP DV group matching searching interface level and makes the icon enter a flickering status for searching, comparing and matching (also referring to FIG. 10).

At sub-block 3190, the color of the searching cursor is turned to gray, indicating that there is no matched wireless module.

At sub-block 3192, the MCU 140 decides whether there is completely no matched automatic map codes for the wireless modules. If no, then the method 30 moves to sub-block 3202. If yes, the method moves to sub-block 3204. Sub-blocks 3202, 3204, 3206, 3208 are included in block 320.

At sub-block 3202, the matching between the wireless modules of the master electronic device and the slave electronic device is completed. Then the method 30 can flow to block 322 (FIG. 16, not shown in FIG. 22).

At sub-block 3204, whether the master electronic device is set up with the operation software for controlling operation of the slave electronic device is judged. If the answer is yes, the method flows to sub-block 3206, and if the answer is no the method flows to sub-block 3208.

At sub-block 3206, the matching between the software modules of the master electronic device and the software modules of the slave electronic device is completed.

At sub-block 3208, the display screen 151 shows that there is no matched slave electronic device available. After block 3208, and the method flows to block 328.

Figure 23:
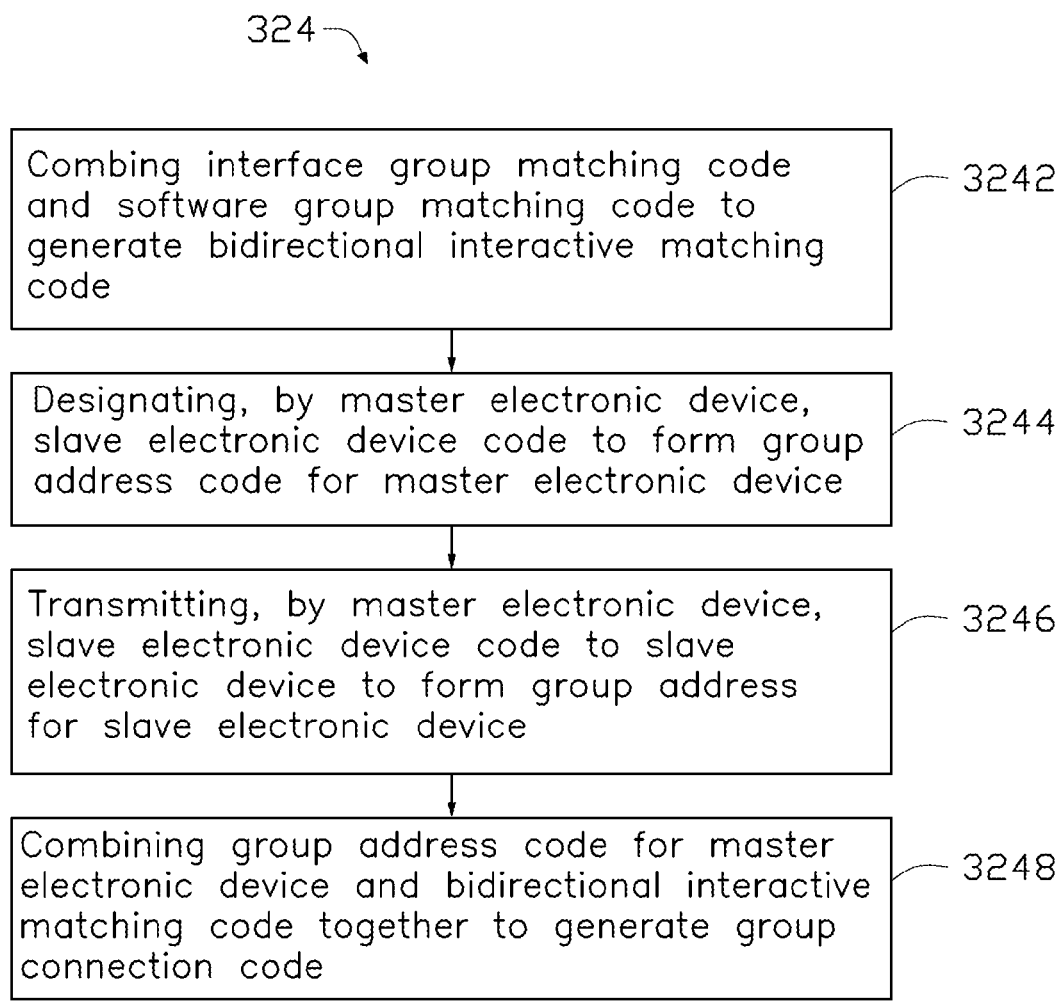
FIG. 23 is a flow chart showing sub-blocks of block 324 of the matching method of FIGS. 15-17.

Referring to FIG. 23, block 324 includes sub-blocks 3242, 3244, 3246, 3248. At sub-block 3242, the MCU 140 detects whether the software for generating IPG/DV bidirectional interactive matching code has been executed. If yes, the interface group matching code and software group matching code of the master and slave electronic devices 100A, 200A combine together to generate a bidirectional interactive matching code: ((200A2101-200A2102-200A2103)-(200A2104))-((100A1101-100A1102-100A1103)-(100A1104)).

At sub-block 3244, the master electronic device sets up an DV1 code (i.e., slave electronic device code) which is saved into the second storage units 1123 of the wireless modules 1101, 1102, 1103 of the master electronic device 100A to form the group address code for the master electronic device.

At sub-block 3246, the MCU 140 of the master electronic device sends the DV1 code to the identification module 220 of the slave electronic device 200A via the identification module 160. The DV1 code is saved into the second storage units 2121 of the wireless modules 2101, 2102, 2103 of the slave electronic device via the MCU 221 to form the group address code DV1 for the slave electronic device.

At block 3248, the MCU 140 of the master electronic device combine the DV1 code in the second storage units 2121 of the slave electronic device and the bidirectional interactive matching code in the first storage units 1121 of the master electronic device together to generate a group connection code: DV1-((200A2101-200A2102-200A2103)-(200A2104))-((100A1101-100A1102-100A1103)-(100A1104)). The group connection codes for the master electronic devices 100A 100B, 100C to connect with the slave electronic devices 200A, 200B, 200C are as follows:

DV1-((200A2101-200A2102-200A2103)-(200A2104))-((100A1101-100A1102-100A1103)-(100A1104)) for the master and slave electronic devices 100A, 200A;

DV2-((200B2101-200B2102-200B2103)-(200B2104))-((100A1101-100A1102-100A1103)-(100A1104)) for the master and slave electronic devices 100A, 200B;

DV3-((200C2101-200C2102-200C2103)-(200C2104))-((100A1101-100A1102-100A1103)-(100A1104)) for the master and slave electronic devices 100A, 200C;

BDV1-((200A2101-200A2102-200A2103)-(200A2104))-((100B1101-100B1102-100B1103)-(100B1104)) for the master and slave electronic devices 100B 200A;

BDV2-((200B2101-200B2102-200B2103)-(200B2104))-((100B1101-100B1102-100B1103)-(100B1104)) for the master and slave electronic devices 100B, 200B;

BDV3-((200C2101-200C2102-200C2103)-(200C2104))-((100B1101-100B1102-100B1103)-(100B1104)) for the master and slave electronic devices 100B, 200C;

CDV1-((200A2101-200A2102-200A2103)-(200A2104))-((100C1101-100C1102-100C1103)-(100C1104)) for the master and slave electronic devices 100C, 200A;

CDV2-((200B2101-200B2102-200B2103)-(200B2104))-((100C1101-100C1102-100C1103)-(100C1104)) for the master and slave electronic devices 100C, 200B; and CDV3-((200C2101-200C2102-200C2103)-(200C2104))-((100C1101-100C1102-100C1103)-(100C 1104)) for the master and slave electronic devices 100C, 200C.

The group connection codes for the slave electronic devices 200A, 200, 200C to connect with the master electronic devices 100A, 100B, 100C are as follows:

DV1-((200A2101-200A2102-200A2103)-(200A2104))-((100A1101-100A1102-100A1103)-(100A1104)) for the slave and master electronic devices 200A, 100A;

BDV1-((200A2101-200A2102-200A2103)-(200A2104))-((100B1101-100B1102-100B1103)-(100B1104)) for the slave and master electronic devices 200A, 100B;

CDV1-((200A2101-200A2102-200A2103)-(200A2104))-((100C1101-100C1102-100C1103)-(100C1104)) for the slave and master electronic devices 200A, 100C;

DV2-((200B2101-200B2102-200B2103)-(200B2104))-((100A1101-100A1102-100A1103)-(100A1104)) for the slave and master electronic devices 200B, 100A;

BDV2-((200B2101-200B2102-200B2103)-(200B2104))-((100B1101-100B1102-100B1103)-(100B1104)) for the slave and master electronic devices 200B 100B;

CDV2-((200B2101-200B2102-200B2103)-(200B2104))-((100C1101-100C1102-100C1103)-(100C1104)) for the slave and master electronic devices 200B, 100C;

DV3-((200C2101-200C2102-200C2103)-(200C2104))-((100A1101-100A1102-100A1103)-(100A1104)) for the slave and master electronic devices 200C, 100A;

BDV3-((200C2101-200C2102-200C2103)-(200C2104))-((100B1101-100B1102-100B1103)-(100B1104)) for the slave and master electronic devices 200C, 100B; and CDV3-((200C2101-200C2102-200C2103)-(200C2104))-((100C1101-100C1102-100C1103)-(100C1104)) for the slave and master electronic devices 200C, 100C.

Figure 24:
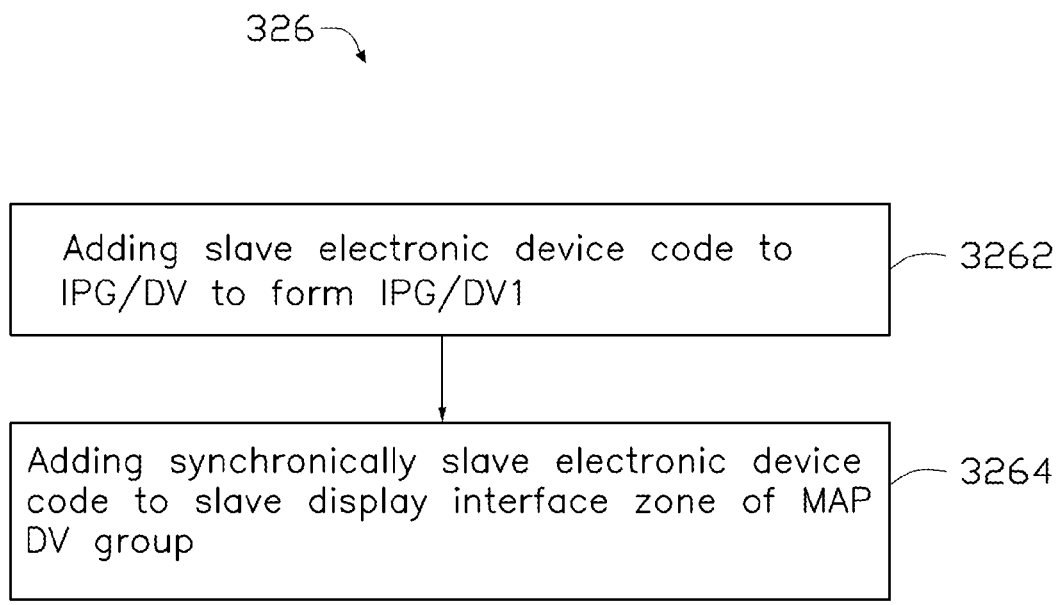
FIG. 24 is a flow chart showing sub-blocks of block 326 of the matching method of FIGS. 15-17.

Referring to FIG. 24, block 326 includes sub-blocks 3262, 3264. At sub-block 3262, the master electronic device sets up a new DV code. The designated number of the new DV code is the maximum number of the original DV code plus 1 whereby the new DV code is DV1 since in this embodiment, the maximum number of the original DV code is 0 in the register. The DV1 is added to IPG/DV to form IPG/DV1 thereby to indicate that the group matching is successful.

Figure 11:
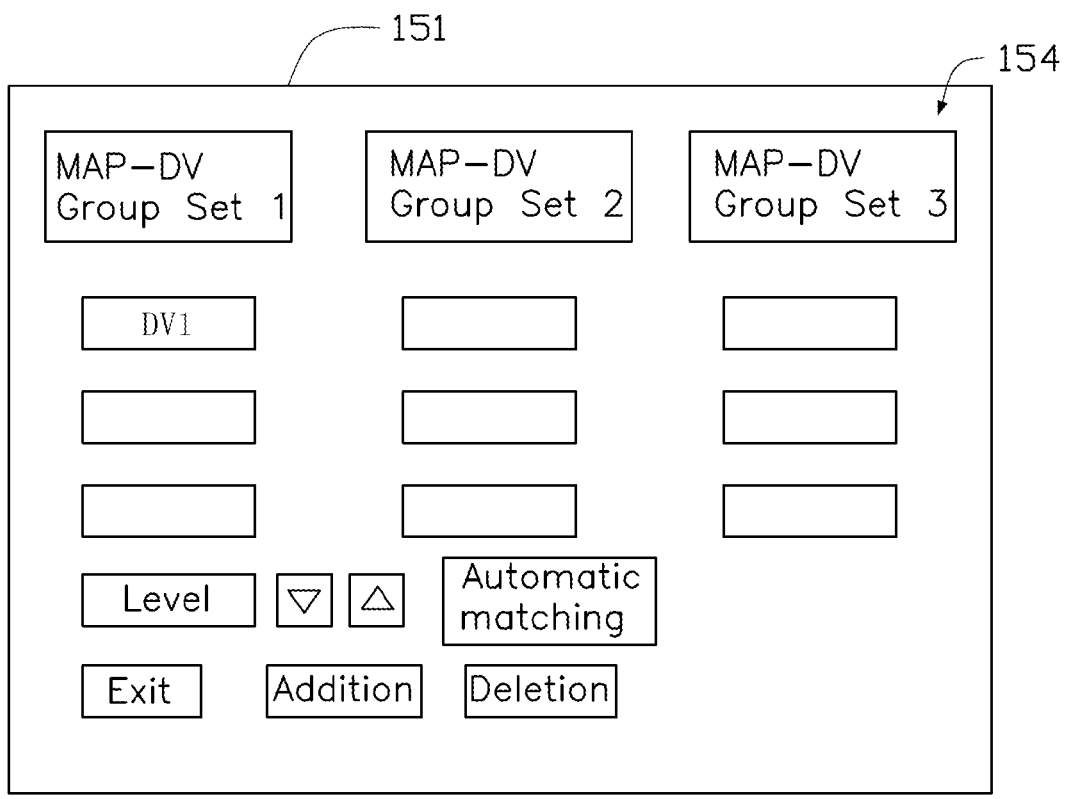
FIG. 11 is an eighth screenshot of the display screen of the master electronic device.

At sub-block 3264, the DV1 code is synchronically added to the DV display interface region of MAP DV group set 1 of the automatic matching group control level to show DV1 (referring to FIG. 11).

At block 328, whether there is a need to choose another slave electronic device for the master electronic device to match is determined. If not necessary, the group matching method 30 is ended. If necessary the method 30 flows back to block 304 to repeat the method 30 therefrom.

When the master electronic device 100A for example successfully matches and connects with the slave electronic device 200A (B, C), the display screen 151 shows the function control window (OSD interface). If the slave electronic device 200A is a television, the function control window is for controlling the volume, the brightness, the channel, etc. of the slave electronic device 200A. If the slave electronic device 200B is a radio, the function control window is for controlling the volume, channel, etc. of the slave electronic device 200B. By activating a function by, for example, pressing a corresponding icon on the window, the MCU 140 of the master electronic device 100A detects the pressing and retrieves the function control software for the selected slave electronic device from the fourth storage unit. Then the MCU 140 sends out corresponding function control signals to the control bus, whereby the control signals are transmitted to the wireless modules 2101, 2102, 2103 of the selected slave electronic device 200A (B, C) via the MCUs 1114, 1115, 1116 of the master electronic device 100A. The wireless modules 2101, 2102, 2103 send the received control signals to the MCUs 2111, 2112, 2113 to perform the corresponding function controls for the selected slave electronic device 200A (B, C).

Referring again to FIG. 3, the slave electronic device 200A (B, C) further comprises a video/audio signal source 260, a USB hub 230, a video/audio signal processing unit 240 and a display unit 250.

The video/audio signal source 260 is coupled with the wireless module 2103. The video/audio signals from the video/audio signal source 260 can be transmitted to the master electronic device 100A, for example, via the wireless module 2103. The master electronic device 100A and the slave electronic device 200A (B, C) both can play the video and audio contents from the video/audio signal source 260.

The USB hub 230 is coupled with the wireless module 2101, and connects with a keyboard 300, a mouse 400 and a hard disk drive 500. The keyboard 300 and the mouse 400 each can function as an input device for both the master electronic device 100A and the slave electronic device 200A (B, C). The input device can also include a touch panel (not shown). The hard disk drive 500 functions as a storage device for the slave electronic device 200A (B, C) and connects with the wireless module 2101, whereby the hard disk drive 500 can couple with the master electronic device 100A via the wireless module 1101 thereof.

The video/audio signal processing unit 240 is coupled with the wireless module 2102 and the display unit 250. The video/audio signal processing unit 240 can process video/audio signals from the second port 1112 of the master electronic device 100A and output the processed signals to the display unit 250.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A method for matching a plurality of electronic devices including at least one master electronic device and at least one slave electronic device, the method comprising:
   entering a system for group matching by activating group matching application software;
   activating an automatic group matching mode of the at least one master electronic device;

generating a master automatic matching identification code for a wireless module of the at least one master electronic device;

activating a group matching mode of the at least one slave electronic device to generate a function software automatic matching code and a slave automatic matching identification code for a wireless module of the at least one slave electronic device;

activating an identification module of the at least one master electronic device to send out the master automatic matching identification code including a master wireless module interface code;

determining, by the at least one slave electronic device, whether the master wireless module interface code in the master automatic matching identification code corresponds to a slave wireless module interface code in the slave automatic matching identification code, and writing, when the master wireless module interface code corresponds to the slave wireless module interface code, the master wireless module interface code into the wireless module of the at least one slave electronic device to generate an interface matching code;

setting up a function software, when the function software automatic matching code sent out by the at least one slave electronic device has been stored in the at least one master electronic device in advance, having the function software automatic matching code as the function software for controlling an operation of the at least one slave electronic device;

completing the automatic matching between the wireless modules of the at least one master and slave electronic devices and saving the slave wireless module interface code into the wireless module of the at least one master electronic device;

generating group interface matching codes and group software matching codes for the at least one master electronic device and the at least one slave electronic device; and generating a group address code for group connection by combining the group interface matching codes and the group software matching codes together.

2. The method of claim 1, wherein the master automatic matching identification code for the wireless module of the at least one master electronic device is generated by following steps:

activating an automatic map code in the wireless module of the at least one master electronic device;

activating the master wireless module interface code; and combining the automatic map code and the master wireless module interface code together to generate the master automatic matching identification code for the wireless module of the at least one master electronic device.

3. The method of claim 1, wherein the interface matching code is generated by following steps:

receiving, by the at least one slave electronic device, the master automatic matching identification code sent out by the identification module;

determining, by the at least one slave electronic device, whether the automatic map code in the master automatic matching identification code corresponds to an automatic map code stored in the slave automatic matching identification code;

comparing, by the at least one slave electronic device, the slave wireless module interface code with the master wireless module interface code to see whether they are corresponding to each other when the automatic map code of the slave automatic matching identification code is corresponding to the automatic map code of the master automatic matching identification code; and storing, by the at least one slave electronic device, the master wireless module interface code into the wireless module for the at least one slave electronic device to form the interface matching code when the slave wireless module interface code is corresponding to the master wireless module interface code.

4. The method of claim 1, wherein the setting up of a function software comprising following steps:

transmitting out, by the at least one slave electronic device, the function software automatic matching code;

receiving, by the at least one master electronic device, the function software automatic matching code;

comparing, by the at least one master electronic device, the received function software automatic matching code with a function software automatic matching code stored in the at least one master electronic device to see whether they are corresponding to each other; and setting up, by the at least one master electronic device, the function software having the function software automatic matching code as the operation software of the at least one master electronic device when the received function software automatic matching code is corresponding to the function software automatic matching code stored in the at least one master electronic device.

5. The method of claim 1, wherein the group address code is generated by following steps:

detecting whether a bidirectional, interactive matching code generating unit is activated, and, if yes, combining the group interface matching codes and the group software matching codes together to form a bidirectional, interactive matching code;

setting up a slave electronic device code for the at least one slave electronic device in the at least one master electronic device;

storing the slave electronic device code into the wireless module of the at least one master electronic device to form the group address code for the at least one master electronic device; and sending, by the at least one master electronic device, the slave electronic device code to the at least one slave electronic device via the identification module and storing the slave electronic device code in the wireless module of the at least one slave electronic device to form the group address code for the at least one slave electronic device.

6. The method of claim 5, wherein in the step of entering a system for group matching, the at least one master electronic device moves from a first level which is an application interface level into a second level which is a group matching control level, the step of activating group matching mode is performed in the second level, and the method further comprises a deletion, an addition or an exit of a matched slave electronic device or a shift between different levels executed by at least one master electronic device at the second level of group matching control level.

7. The method of claim 6, further comprising displaying the slave electronic device code of the at least one slave electronic device on a zone of a matched group of slave electronic device of the second level of group matching control level, and by clicking the slave electronic device code a group connection between the at least one master and slave electronic devices is performed in a wired or wireless manner.

8. The method of claim 1, wherein when the master wireless module interface code does not correspond to the slave wireless module interface code, the method flows to the step of activating an automatic group matching mode of the at least one master electronic device to repeat the steps of the method therefrom for another grouping.

9. The method of claim 1, wherein the step of activating an automatic group matching mode of the at least one slave electronic device is achieved by activating a button of the at least one slave electronic device for automatic group matching or brining the at least one master electronic device near the at least one slave electronic device.

10. The method of claim 1, wherein the wireless module of the at least one master electronic device comprises one of following wireless modules: Bluetooth module, Wi-Fi module, Miracast module, Wide module or WiGig module, and one of following communication ports: DP port, HDMI port, MHL port, USB port, E-Sata port or C BUS ($I^2C$, GPIO, UART, RS232, PWM) port.

* * * * *